United States Patent
Megretski et al.

(10) Patent No.: US 10,972,326 B2
(45) Date of Patent: Apr. 6, 2021

(54) SPECTRUM SHAPING CREST FACTOR REDUCTION

(71) Applicant: NanoSemi, Inc., Waltham, MA (US)

(72) Inventors: Alexandre Megretski, Acton, MA (US); Zohaib Mahmood, Westwood, MA (US); Helen H. Kim, Sudbury, MA (US); Andrew Feldman, Redmond, WA (US)

(73) Assignee: NanoSemi, Inc., Waltham, MA (US)

( * ) Notice: Subject to any disclaimer, the term of this patent is extended or adjusted under 35 U.S.C. 154(b) by 0 days.

(21) Appl. No.: 16/810,099

(22) Filed: Mar. 5, 2020

(65) Prior Publication Data

US 2020/0204420 A1    Jun. 25, 2020

Related U.S. Application Data

(63) Continuation-in-part of application No. PCT/US2018/060021, filed on Nov. 9, 2018.
(Continued)

(51) Int. Cl.
*H04L 27/26* (2006.01)
*H04L 25/03* (2006.01)
(Continued)

(52) U.S. Cl.
CPC .... *H04L 27/2614* (2013.01); *H04L 25/03828* (2013.01); *H04L 25/03834* (2013.01); *H04B 1/0475* (2013.01); *H04B 1/16* (2013.01)

(58) Field of Classification Search
CPC .......... H04B 1/0475; H04B 1/16; H04B 1/10; H04B 2001/0416; H04B 2001/0425;
(Continued)

(56) References Cited

U.S. PATENT DOCUMENTS 6,879,642 B2   4/2005  Taskinen
7,643,801 B2   1/2010  Piirainen
(Continued)

OTHER PUBLICATIONS

Nakamura, T., Kimura, S., Saito, M., Okada, M. (2019), "A Novel Low Complexity Clipping Method for OFDM Signals".
(Continued)

*Primary Examiner* — Leila Malek
(74) *Attorney, Agent, or Firm* — Occhiuti & Rohlicek LLP

(57) ABSTRACT

Disclosed are methods, systems, devices, apparatus, media, design structures, and other implementations, including a method that includes receiving a signal for radio transmission, and configuring crest factor reduction (CFR) processing characteristics, at a wireless device, to apply to the received signal to modify one or more portions of the signal based on an asymmetrical spectral mask, representative of an asymmetric frequency envelope limiting allowed magnitudes for frequency components bounded by the asymmetrical spectral mask, with the asymmetrical spectral mask being defined based on spectral characteristics requirements specified by multiple regulatory radio frequency (RF) power requirements at frequencies affecting a frequency range of the asymmetrical spectral mask. The method further includes applying CFR processing to the received signal according to the configured CFR processing characteristics to produce a resultant output signal with a resultant spectral representation bound by the asymmetrical spectral mask.

20 Claims, 14 Drawing Sheets

Related U.S. Application Data

(60) Provisional application No. 62/584,985, filed on Nov. 13, 2017.

(51) Int. Cl.
*H04B 1/04* (2006.01)
*H04B 1/16* (2006.01)

(58) Field of Classification Search
CPC . H04B 15/00; H04L 25/03834; H04L 1/0041; H04L 27/2614
USPC .......................................................... 375/297
See application file for complete search history.

(56) References Cited

U.S. PATENT DOCUMENTS

| | | |
|---|---|---|
| 7,839,951 B2 | 11/2010 | Cai et al. |
| 8,457,249 B2 | 6/2013 | Gotman et al. |
| 8,619,903 B2 | 12/2013 | Schmidt et al. |
| 9,014,319 B1 | 4/2015 | Copeland |
| 9,313,078 B1 | 4/2016 | Barman et al. |
| 2002/0107673 A1 | 8/2002 | Haller et al. |
| 2004/0076247 A1 | 4/2004 | Barak et al. |
| 2006/0154622 A1 | 7/2006 | Piirainen |
| 2008/0019453 A1 | 1/2008 | Zhao et al. |
| 2008/0101502 A1* | 5/2008 | Navidpour ............... H04L 1/06 375/296 |
| 2008/0247487 A1* | 10/2008 | Cai .................... H04L 27/2623 375/296 |
| 2010/0042956 A1 | 2/2010 | Lan |
| 2012/0093209 A1 | 4/2012 | Schmidt et al. |
| 2012/0093210 A1 | 4/2012 | Schmidt et al. |
| 2014/0269984 A1 | 9/2014 | Piazzi et al. |
| 2018/0359126 A1 | 12/2018 | Wang |

OTHER PUBLICATIONS

Andraka, R (1998), "A survey of CORDIC algorithms for FPGA based computers", Proceedings of the 1998 ACM/SIGDA sixth international symposium on Field Programmable Gate Arrays, pp. 191-200.

Hill, G., Faulkner, M. (2002), "Comparison of low complexity clipping algorithms for OFDM", Proc. 13th IEEE International Symposium on Personal Indoor and Mobile Radio Communications (PIMRC) 2002.

Lakshmi, B., Dhar, A.S. (2009), "CORDIC Architectures: A Survey," VLSI Design, vol. 2010.

International Search Report and Written Opinion, PCT Application No. PCT/US2018/060021, dated Jan. 11, 2019 (7 pages).

* cited by examiner

SPECTRUM SHAPING CREST FACTOR REDUCTION

CROSS-REFERENCE TO RELATED APPLICATIONS

This application is a continuation-in-part (CIP) application of, and claims priority to International Application No. PCT/US2018/060021, entitled "Spectrum Shaping Crest Factor Reduction," and filed Nov. 9, 2018, which in turn claims the benefit of, and priority to U.S. Provisional Application No. 62/584,985, entitled "Spectrum Shaping Crest Factor Reduction" and filed Nov. 13, 2017, the content of which is incorporated herein by reference in its entirety.

BACKGROUND

The present disclosure relates to crest factor reduction.

In many communication systems, it is desirable that the peak amplitude of a signal be limited relative to an average, e.g., relative to an average root-mean-square (RMS) or average absolute magnitude. An amplification component for a radio frequency power amplifier, for example, may exhibit substantial distortion beyond a certain output amplitude, and therefore to avoid introducing distortion resulting from such a limit (e.g., "clipping"), it is desirable to pre-process the signal so that the input signal does not cause distortion in the output. However, such clipping operations result in changes to the frequency behavior of the clipped signals, which may result in damaged signals in band or spectral leakage outside the band.

SUMMARY

In a general aspect, an approach to spectrum shaping for a signal processed by a crest factor reduction (CFR) system is disclosed that produces signals that are at least partly attenuated or clipped up to a threshold. In the implementations described herein, optimized filtering is performed to produce a signal that fills (or "packs") the frequency spectrum below some pre-determined spectral envelope (referred to as the spectral emission mask, or SEM). In some embodiments, the processing of the input (received) signal may be performed by subtracting from the input signal a derived subtraction pulse. In such embodiments, the pulses are computed and generated according to some optimization criteria, and subject to the constraint that the resultant spectrum of the resultant modified output signal is bounded by the pre-determined SEM envelope. Alternatively, in some embodiments, the input signal may be attenuated (through filtering operations) to produce the desired output signal that meets the optimization criterion under the SEM constraint.

In some situations, asymmetrical spectrum shaping (e.g., based on an asymmetrical spectral emission mask) may be realized. Such spectrum shaping may be applied when there are different regulatory requirements on the left and right side of a carrier, thus yielding an asymmetrical spectrum. In the approaches discussed herein, the frequency range can be divided into segments with respective spectrum definitions. The shape of each segment can be constant, linear or any arbitrary shape.

In some examples, CFR processing may be implemented using a reconfigurable CFR block/section. This reconfigurability allows using CFR stages as "LEGO blocks" to rewire the implementation as needed. As an example, a typical CFR implementation could have three (3) stages of 33-Tap FIR filters. However, if an asymmetric spectral behavior (e.g., due to regulatory constraints) is needed, a 33-tap filter may not be sufficient. In that case, the three stages of 33-tap implementations can be reconfigured to one (1) stage of 99-tap FIR filter. With such reconfigurability, better performance may be achieved for every use case without the need to over-design.

Accordingly, in some variations, a method is provided that includes receiving a signal for radio transmission, and adjusting crest factor reduction (CFR) processing characteristics applied to the received signal to modify one or more portions of the signal according to a spectral mask representative of a frequency envelope limiting allowed magnitudes for frequency components bounded by the spectral mask. Adjusting the CFR processing characteristics includes adjusting the CFR processing characteristics according to one or more optimization criteria for output signals generated based on the adjusted CFR processing characteristics, and subject to a constraint that the output signals generated based on the adjusted CFR processing characteristics are bound by the spectral mask. The method further includes applying CFR processing with the adjusted CFR processing characteristics to the received signal to produce a resultant modified signal, and amplifying the resultant modified signal.

Embodiments of the method may include at least some of the features described in the present disclosure, including one or more of the following features.

Applying the CFR processing with the adjusted CFR processing characteristics may include generating a subtraction pulse using the adjusted CFR processing characteristics based, at least in part, on the received signal, and subtracting the subtraction pulse from the received signal to produce the resultant modified signal.

Generating the subtraction pulse may include adjusting one or more pulse properties defining the subtraction pulse such that the modified signal resulting from subtracting the subtraction pulse substantially optimally occupies the spectral space under the pre-determined spectral envelope.

Adjusting the one or more pulse properties may include adjusting one or more of, for example, a pulse shape, and/or a pulse length.

Applying the CFR processing with the adjusted CFR processing characteristics may include attenuating the received signal using the CFR processing with the adjusted CFR processing characteristics to produce the resultant modified signal.

Applying the CFR processing with the adjusted CFR processing characteristics may include processing the received signal by a filter chain comprising one or more CFR stages that each includes a respective peak detector coupled, at an output of the respective peak detector, to a respective finite impulse response (FIR) filter with adjustable coefficients optimized subject to the constraint that the output signals generated at an output of the filter chain are bound by the spectral mask.

The filter chain may further include a downstream hard clip module coupled to a downstream output of the one or more CFR stages.

Processing the received signal by the filter chain may include generating, by the respective peak detector, based on a respective CFR-stage input signal to the respective one or more CFR stages, a center-clipped signal representing samples of the respective CFR-stage input signal with a magnitude greater than $\gamma_i$, where $\gamma_i$ is a clipping threshold for the respective peak detector of the respective one or more CFR stages. In some embodiments, generating the center-clipped signal may be computed according to:

$$u_{PEAKS-i}[n] = u_{i-1}[n] - \frac{u_{i-1}[n]}{\max\left(1, \frac{|u_{i-1}[n]|}{\gamma_i}\right)}$$

where $u_{PEAKS-i}[n]$ is the center-clipped signal, i is a respective stage number of the respective one or more CFR stages, and $u_{i-1}[n]$ is the respective CFR-stage input signal to the respective one or more CFR stages.

Adjusting the CFR processing characteristics according to the one or more optimization criteria for the output signals generated based on the adjusted CFR processing characteristics may include producing the resultant modified signal according to a criterion that minimizes a computed error vector magnitude (EVM) for the resultant modified signal for a given peak-to-average power ratio (PAPR).

Adjusting the CFR processing characteristics according to the one or more optimization criteria for the output signals generated based on the adjusted CFR processing characteristics may include producing the optimized resultant modified signal according to a criterion that minimizes a given peak-to-average power ratio (PAPR) for a given error vector magnitude (EVM) for the resultant modified signal.

Producing the optimized resultant signal may include determining a resultant signal v(t), produced through crest factor reduction operations, from an input signal u(t) such that v(t) has a small peak to average power ratio ($PAPR_v$), where $|v-u|/|u|$ is equal to or less than $EVM_T$, and in which v complies with a predetermined spectral emission mask $SEM_T$.

Determining the resultant signal v(t) may be performed according to an optimization process such as:

$$\text{minimize } PAPR(v) = \frac{\max(|v|)}{rms(v)}$$

$$\text{subject to: } \frac{|u-v|}{|u|} \leq EVM_T, \text{ and}$$

$$SEM(v) < SEM_T.$$

Adjusting the CFR processing characteristics according to the one or more optimization criteria may include selecting one or more CFR processing characteristics from a list of controllable attributes that includes at least one of, for example, pulse length, number of peak trackers, number of CRF stages, at least one hard clipping factor representing the amount of crest factor reduction in each of a series of stages, peak qualification window size representative of a smallest time separation of peaks that are cancelled, number of iterations of shape optimization, number of starting shapes for the optimization, objective to be optimized, pulse shape factor with a value between 0 and 1 that is used to form a smooth discrete time function that mimics the shape of a bandpass filter spectrum for the band in which the pulse will be used, a band stretch ratio with a value ρ between −1/2 and 1/2 which determines the factor (1+ρ) by which the basic spectrum band is stretched, and/or band relative weight factor with a number f between 1/2 and 3/2 that is used for multi-band configurations to determine how to distribute compensation scale factor between two or more bands). The method may further include assigning pre-determined values to non-selected CFR processing characteristics from the list of controllable attributes, and iteratively computing values for the selected one or more CFR processing characteristics, based on the non-selected CFR processing characteristics assigned with the pre-determined values, that achieve spectrum packing inside the spectral mask.

In some variations, a crest factor reduction (CFR) system is provided that includes a controller configured to receive a signal for radio transmission, and adjust CFR processing characteristics applied to the received signal to modify one or more portions of the signal according to a pre-determined spectral mask representative of a frequency envelope limiting allowed magnitudes for frequency components bounded by the spectral mask. The controller configured to adjust the CFR processing characteristics is configured to adjust the CFR processing characteristics according to one or more optimization criteria for output signals generated based on the adjusted CFR processing characteristics, and subject to a constraint that the output signals generated based on the adjusted CFR processing characteristics are bound by the pre-determined spectral mask. The controller is further configured to apply CFR processing with the adjusted CFR processing characteristics to the received signal to produce a resultant modified signal. The CFR system further includes an amplifier to amplify the resultant modified signal.

In some variations, a design structure is provided that is encoded on a non-transitory machine-readable medium, with the design structure including elements that, when processed in a computer-aided design system, generate a machine-executable representation of the crest factor reduction (CFR) system that includes a receiving circuit to receive a signal for radio transmission, and an adjustment circuit to adjust crest factor reduction (CFR) processing characteristics applied to the received signal to modify one or more portions of the signal according to a pre-determined spectral mask representative of a frequency envelope limiting allowed magnitudes for frequency components bounded by the spectral mask, with the adjustment circuit to adjust the CFR processing characteristics being configured to adjust the CFR processing characteristics according to one or more optimization criteria for output signals generated based on the adjusted CFR processing characteristics, and subject to a constraint that the output signals generated based on the adjusted CFR processing characteristics are bound by the pre-determined spectral mask. The representation of the CFR system further includes a control circuit to apply CFR processing with the adjusted CFR processing characteristics to the received signal to produce a resultant modified signal, and an amplification circuit to amplify the resultant modified signal.

In some variations, another method is provided that includes receiving a signal for radio transmission, configuring crest factor reduction (CFR) processing characteristics, at a wireless device, to apply to the received signal to modify one or more portions of the signal based on an asymmetrical spectral mask, representative of an asymmetric frequency envelope limiting allowed magnitudes for frequency components bounded by the asymmetrical spectral mask, with the asymmetrical spectral mask being defined based on spectral characteristics requirements specified by multiple regulatory radio frequency (RF) power requirements at frequencies affecting a frequency range of the asymmetrical spectral mask, and applying CFR processing to the received signal according to the configured CFR processing characteristics to produce a resultant output signal with a resultant spectral representation bound by the asymmetrical spectral mask.

Embodiments of the other method may include at least some of the features described in the present disclosure, including at least some of the features described above in relation to the first method and the CFR system, as well as one or more of the following features.

The method may further include determining a spectral band for operation of the wireless device. Configuring CFR processing characteristics may include configuring CFR processing characteristics based on the determined spectral band to modify one or more portions of the signal based on a respective, band-related, asymmetrical spectral mask associated with the determined spectral band (e.g., different bands may be associated with different respective masks).

Configuring the CFR processing characteristics may include selecting, based on the determined spectral band, one of a plurality of pre-determined CFR filters.

Configuring the CFR processing characteristics may include configuring, based on the determined spectral band, a CFR pulse subtraction filter chain with a number of CFR stages, p, with p≥1, and with respective stage lengths, l, representative of filter tap numbers for the respective p stage, with p and l depending on the determined spectral band and on the respective band-related asymmetrical spectral mask.

Configuring the pulse subtraction filter chain may include realizing the CFR pulse subtraction filter chain with the p stages and the respective stage lengths l based on slopes of segments defining the respective band-related asymmetrical spectral mask near the location of the determined spectral band.

Each of the p CFR stages may include a respective peak detector coupled, at an output of the respective peak detector, to a respective finite impulse response (FIR) filter with adjustable coefficients optimized subject to the constraint that output signals generated at an output of the CFR pulse subtraction filter chain are bound by the respective band-related asymmetrical spectral mask.

The multiple regulatory RF power requirements may include one or more of, for example, an IEEE RF power requirements, and/or a Federal Communication Commission (FCC) RF power requirements.

The configured CFR processing characteristics may be determined based on processing input signals to generate respective output signals according to one or more optimization criteria, and subject to a constraint that a spectral representation of the generated respective output signals are bound by the asymmetrical spectral mask.

Configuring the CFR processing characteristics may include configuring a CFR pulse subtraction filter chain with a number of CFR stages, p, with p≥1, and with respective stage lengths, l, representative of filter tap numbers for the respective p stage, with p and l depending on characteristics of the asymmetrical spectral mask.

Configuring the pulse subtraction filter chain may include realizing the CFR pulse subtraction filter chain with p stage and respective stage lengths l based on slopes of segments defining the asymmetrical spectral mask near the location of the determined spectral band.

Each of the p CFR stages may include a respective peak detector coupled, at an output of the respective peak detector, to a respective finite impulse response (FIR) filter with adjustable coefficients optimized subject to the constraint that output signals generated at an output of the CFR pulse subtraction filter chain are bound by the asymmetrical spectral mask.

Processing the received signal by the CFR pulse subtraction filter chain may include generating, by the respective peak detector, based on a respective CFR-stage input signal to the respective one of the p CFR stages, a center-clipped signal representing samples of the respective CFR-stage input signal with a magnitude greater than $\gamma_i$, where $\gamma_i$ is a clipping threshold for the respective peak detector of the respective one of the p CFR stages.

Generating the center-clipped signal may include generating the center-clipped signal according to $$u_{PEAKS-i}[n] = u_{i-1}[n] - \frac{u_{i-1}[n]}{\max\left(1, \frac{|u_{i-1}[n]|}{\gamma_i}\right)}$$

where $u_{PEAKS-i}[n]$ is the center-clipped signal, i is a respective stage number from the p CFR stages, and $u_{i-1}[n]$ is the respective CFR-stage input signal to the respective stage.

In some variations, another crest factor reduction (CFR) system is provided that includes a controller configured to receive a signal for radio transmission, configure crest factor reduction (CFR) processing characteristics to apply to the received signal to modify one or more portions of the signal based on an asymmetrical spectral mask, representative of an asymmetric frequency envelope limiting allowed magnitudes for frequency components bounded by the asymmetrical spectral mask, the asymmetrical spectral mask being defined based on spectral characteristics specified by multiple regulatory radio frequency (RF) power requirements at frequencies affecting a frequency range of the asymmetrical spectral mask, and apply CFR processing to the received signal according to the configured CFR processing characteristics to produce a resultant output signal with a resultant spectral representation bound by the asymmetrical spectral mask. The CFR system further includes an amplifier to amplify the resultant output signal.

In some variations, a design structure is provided that is encoded on a non-transitory machine-readable medium, with the design structure including elements that, when processed in a computer-aided design system, generate a machine-executable representation of a crest factor reduction system that includes a receiving circuit to receive a signal for radio transmission, a controller circuit to configure crest factor reduction (CFR) processing characteristics, at a wireless device, to apply to the received signal to modify one or more portions of the signal based on an asymmetrical spectral mask, representative of an asymmetric frequency envelope limiting allowed magnitudes for frequency components bounded by the asymmetrical spectral mask, the asymmetrical spectral mask being defined based on spectral characteristics requirements specified by multiple regulatory radio frequency (RF) power requirements at frequencies affecting a frequency range of the asymmetrical spectral mask, and a CFR circuit to apply CFR processing to the received signal according to the configured CFR processing characteristics to produce a resultant output signal with a resultant spectral representation bound by the asymmetrical spectral mask.

In some variations, a non-transitory computer readable media is provided, that is programmed with a set of computer instructions executable on a processor that, when executed, cause operations including receiving a signal for radio transmission, and adjusting crest factor reduction (CFR) processing characteristics applied to the received signal to modify one or more portions of the signal according to a pre-determined spectral mask representative of a frequency envelope limiting allowed magnitudes for frequency components bounded by the spectral mask. Adjusting the CFR processing characteristics includes adjusting the CFR processing characteristics according to one or more optimization criteria for output signals generated based on the adjusted CFR processing characteristics, and subject to a constraint that the output signals generated based on the adjusted CFR processing characteristics are bound by the pre-determined spectral mask. The operations additionally include applying CFR processing with the adjusted CFR processing characteristics to the received signal to produce a resultant modified signal, and amplifying the resultant modified signal.

In some variations, a crest factor reduction system is provided that is configured to perform one or more of the method steps provided above.

In some variations, a design structure is provided that is encoded on a non-transitory machine-readable medium, with the design structure including elements that, when processed in a computer-aided design system, generate a machine-executable representation of one or more of the system modules described above.

In some variations, an integrated circuit definition dataset that, when processed in an integrated circuit manufacturing system, configures the integrated circuit manufacturing system to manufacture one or more of the system modules described above.

In some variations, a non-transitory computer readable media is provided that is programmed with a set of computer instructions executable on a processor that, when executed, cause the operations comprising the various method steps described above.

Embodiments of the crest factor reduction systems, the design structures, the integrated circuit definition datasets, and the computer-readable media may include at least some of the features described in the present disclosure, including at least some of the features described above in relation to the first and second methods.

Other features and advantages of the invention are apparent from the following description, and from the claims.

BRIEF DESCRIPTION OF THE DRAWINGS

These and other aspects will now be described in detail with reference to the following drawings.

Like reference symbols in the various drawings indicate like elements.

DESCRIPTION

Figure 1:
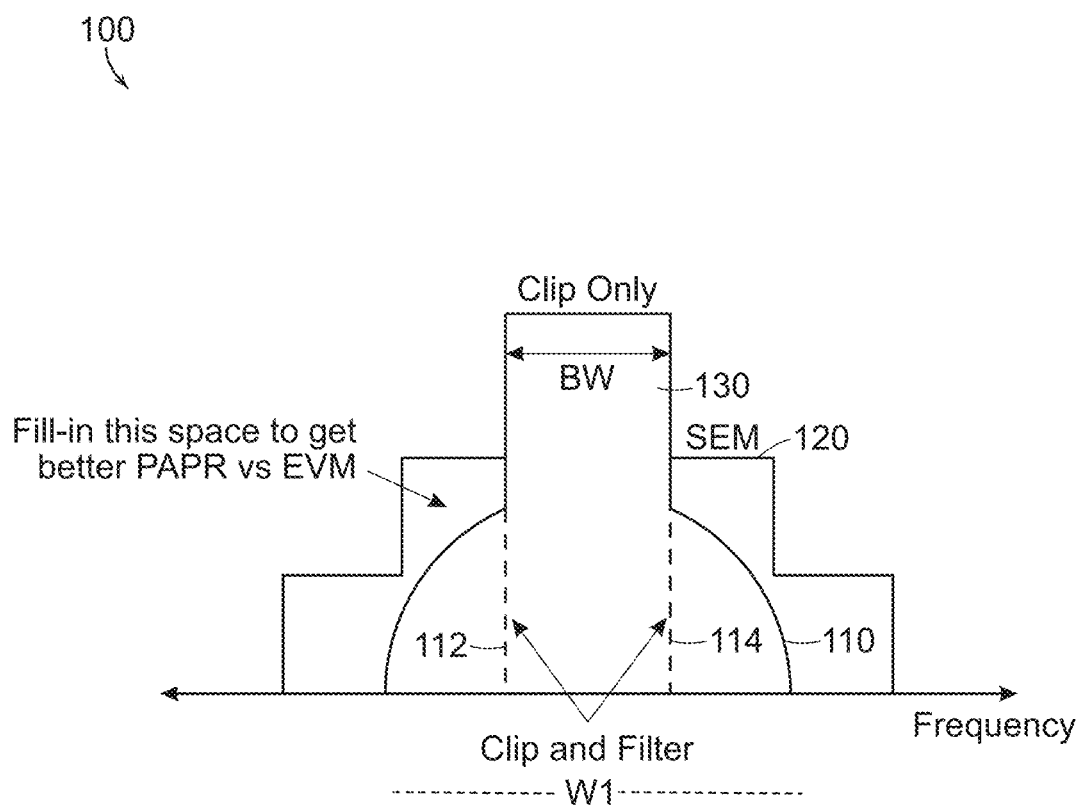
FIG. 1 is a diagram illustrating different spectral processing that may be applied to a signal (or signal segments).

Disclosed herein are methods, systems, devices, media, and other implementations, for spectrum shaping crest factor reduction (CFR), including a method comprising receiving an input signal for radio transmission, and adjusting crest factor reduction (CFR) processing characteristics (e.g., characteristics defining filtering behavior of the CFR system, which may be represented and implemented through digital filters whose coefficients may be controllably adjusted, or, alternatively, characteristics defining subtraction pulses) applied to the received signal to modify one or more portions of the signal according to a pre-determined spectral emission mask (SEM). Adjusting the CFR processing characteristics includes adjusting the CFR processing characteristics according to one or more optimization criteria (e.g., improved EVM for a given PAPR) for output signals generated based on the adjusted CFR processing characteristics, and subject to a constraint that the output signals of the CFR system are bound by the pre-determined spectral mask. The method further includes applying CFR processing with the adjusted CFR processing characteristics to the received signal to produce a resultant modified signal, and amplifying the resultant modified signal. As will be described in greater detail below, in some embodiments, applying the CFR processing with the adjusted characteristics may include generating a subtraction pulse by the CFR system based on the received signal, and subtracting the subtraction pulse from the received signal to produce the resultant modified signal (i.e., implementing a pulse subtraction approach for CFR). Alternatively, in some embodiments, applying the CFR processing with the adjusted characteristics may include attenuating the received signals using the CFR system with the adjusted characteristics to produce the resultant modified signal. In another example implementation described herein, CFR processing may be achieved through one or more FIR filters (e.g., each corresponding to a respective one of one or more CFR stages) applied to center-clipped input signal (e.g., a sample sequence, generated by a peak detector from the input signal to a particular stage of the CFR filter chain) with values representative of the excess magnitude of the input signal to the particular CFR stage above a peak threshold $\gamma_i$.

In some example embodiments, a spectral mask may be used that is an asymmetric mask specifying the asymmetric power requirements over some particular spectral range as a result of having multiple regulatory requirements affecting that spectral range. Thus, in such in embodiments, a method is provided that includes receiving a signal for radio transmission, and configuring crest factor reduction (CFR) processing characteristics, at a wireless device, to apply to the received signal to modify one or more portions of the signal based on an asymmetrical spectral mask, representative of an asymmetric frequency envelope limiting allowed magnitudes for frequency components bounded by the asymmetrical spectral mask, with the asymmetrical spectral mask being defined based on spectral characteristics requirements specified by multiple regulatory radio frequency (RF) power requirements at frequencies affecting a frequency range of the asymmetrical spectral mask. The method additionally includes applying CFR processing to the received signal according to the configured CFR processing characteristics to produce a resultant output signal with a resultant spectral representation bound by the asymmetrical spectral mask. In some examples, the method may further include determining a spectral band for operation of the wireless device. In such examples, configuring CFR processing characteristics may include configuring CFR processing characteristics based on the determined spectral band to modify one or more portions of the signal based on a respective, band-related, asymmetrical spectral mask associated with the determined spectral band.

In the present disclosure, the "crest factor" for the CFR system applied to input signals may be defined as a ratio of a peak value to the average RMS value of a signal waveform. In the present disclosure, the following terminology is used. The quantity "peak-to-average power ratio" (PAPR) is defined as the peak amplitude squared (giving the peak power) divided by the RMS value squared (giving an average power), so PAPR is equal to the square of CFR. Various measures of distortion may be used to evaluate the optimality of the resultant clipped (CFR'ed) signals. For example, an error vector magnitude (EVM) may be defined as the square root of the mean error power divided by the square of the maximum constellation magnitude. Another measure of distortion relates to a spreading of signal energy outside the desired signal band measured as an "adjacent channel power ratio" (ACPR) and defined as a ratio between the total power in adjacent channels (e.g., an intermodulation signal) to the desired channel's power.

As noted, a variety of approaches may be used for CFR. One approach involves upsampling and then clipping the signal, followed by filtering the clipped signal to reduce distortion. Because the filtering may itself introduce new amplitude peaks, this process may be repeated multiple times. In some such approaches, the level at which the signal is clipped may be reduced from stage to stage to progressively meet the target signal shape that achieves the spectral filling in the area under the spectral envelope. In another approach, the amount by which this signal exceeds the clipping signal is filtered by a predefined filter or multiplied by a predefined time-domain window centered at a time location of the peak amplitude (i.e., so that is appropriately band limited), and subtracted from the signal. In such an approach, the process may be repeated in several stages because the filtering or windowing may introduce new peak amplitudes beyond the limit.

Yet another approach identifies locations of peak amplitude above a threshold in an input signal, and subtracts a selected one of different versions (e.g., scaled versions) of one or more predefine pulse shapes, e.g., selecting a pulse shape and/or a scale factor that would result in obtaining a resultant output signal achieving a predefine optimization criterion, and subject to constraint that the spectral components of the resultant signal are contained within the pre-defined spectral envelope (e.g., the SEM envelope). Further details regarding example implementations of pulse subtraction CFR processing are provided, for example, in PCT application No. PCT/US2018/036691, entitled "CREST FACTOR REDUCTION," the content of which is incorporated herein by reference in its entirety.

Determining whether the resultant signal is contained within the pre-defined spectral envelope may require transformation of at least part of the signals (input, intermediary, and/or output signals of the CFR processing) to a frequency domain representation using, for example, FFT processing. The different pulse shapes that may be used may be configured so that they do not add substantial energy outside the permitted signal band.

In some systems, the input signal may represent a combination of signals in two or more frequency limited bands that are separated in frequency with intervening bands. Some of the approaches described herein attempt to process baseband signals representing each of the limited frequency bands with the goal of limiting the amplitude of the combined signal.

Thus, with reference to FIG. 1, a diagram 100 illustrating different spectral processing that may be applied to a signal (or signal segments) is shown. The illustrated signal may be an aggregate of signals from different (e.g., adjacent) channels, with each channel corresponding to a carrier frequency. An example frequency representation 110 corresponds to an example situation in which an input signal is clipped (e.g., through filtered attenuation applied to the signal through one or more filtering operations, or via a pulse subtraction approach), resulting in a spectral composition spanning a spectral width W1 (clipping operations applied to a time-domain, or spatial-domain, signal may result in an expanded spectral composition of the resultant signal in the frequency domain). A similar spectral composition 210 of a signal, processed according to a clip-only approach, is illustrated in a graph 200 of FIG. 2. In some situations, to limit the spectral composition of the resultant signal to a smaller range of frequencies (smaller bandwidth), filtering operation may be applied (as part of "clip and filter" processing operations) to remove frequency portions extending outside the region defined by, for example, dashed lines 112 and 114 illustrated in FIG. 1 (e.g., to limit or inhibit the spectral leaking resulting from the clipping operations). Generally, the band dimensions defining the filtering applied to a clip signal can be determined based on the particular application, i.e., the locations or shapes of the lines 112 and 114 depend on the specific application being realized.

Figure 2:
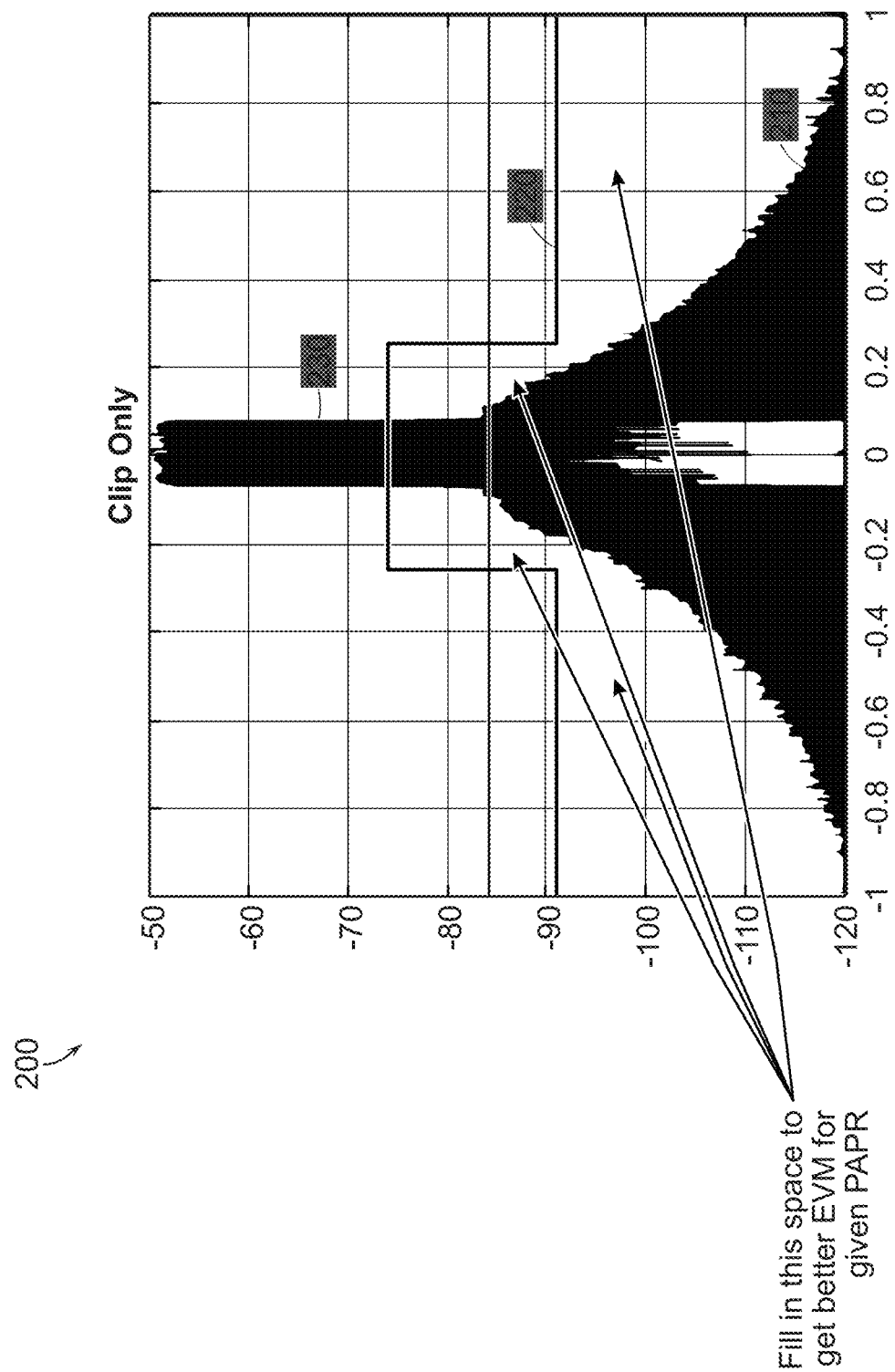
FIG. 2 is another diagram illustrating example spectral processing that may be applied to a signal.

In some embodiments, the locations of the spectral boundaries for a particular signal need to be maintained within specified points (e.g., in cellular-type communications protocols, such as LTE, where spectral leakage from one channel to another may cause interference that degrades the quality of services provided to customers). On the other hand, for some communication applications, e.g., WLAN applications such as WiFi, some level of spectral leakage may be tolerated, and consequently the spectral requirements for clipped signals may be less stringent than for WWAN applications. The less stringent spectral limits required for such communication applications may be represented using a spectral emission mask (SEM) 120 illustrated in FIG. 1 (a similar spectral envelope 220 is illustrated in FIG. 2). The SEM 120 defines the spectral boundary (e.g., outside some central frequency zone represented in FIG. 1 as a central spectral band 130, where most of a signal's energy is concentrated), including the frequency range where leakage (in the form of side lobes) may be tolerated, and the tolerated level (magnitude) of such side spectral components. As shown in FIGS. 1 and 2, notwithstanding that the example spectral boundaries, represented by the SEM's 120 and 220, allow for considerable spectral leeway, the example signals 110 or 210 (resulting from a clip-only operation) do not utilize much of the available area under the SEM boundaries. That is, the magnitudes of the frequency components outside the signal's main lobe is smaller than what may be tolerated for such communication applications.

From a time-domain perspective, this means that signal peaks do not necessarily need to be clipped below some specified amplitude, and that some perturbations (protrusions) of the time-domain signal above the clipping threshold can be tolerated for some communication applications (e.g., WLAN applications), which would result in more power (and thus larger coverage area) that can be used for communication between access-points and client wireless devices (e.g., tablet devices, mobile phone, computers with wireless network interfaces, etc.) Thus, the spectrum packing approach described herein modifies the shapes of the peaks to possibly leave some portion of the peak (albeit still attenuated relative to the original peaks of the input signal) above the clipping threshold.

Figure 3:
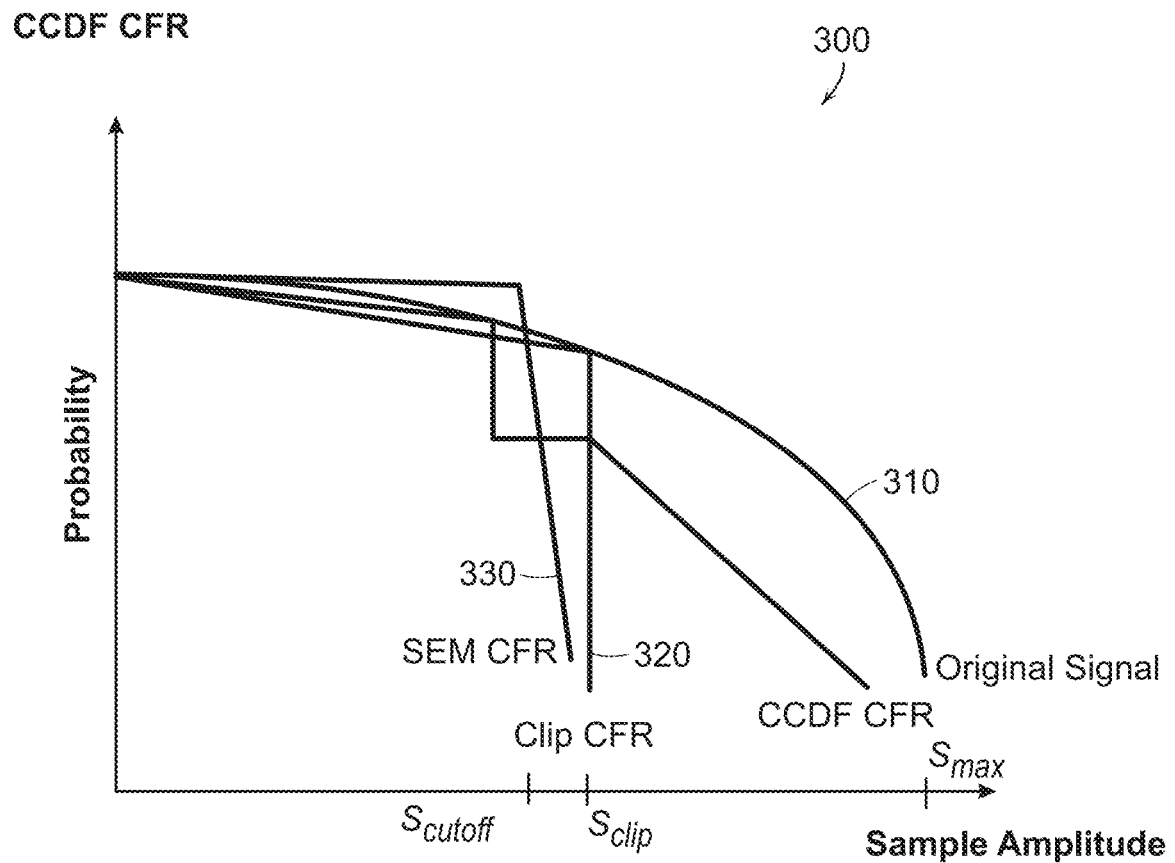
FIG. 3 is a probability graph including probability curves depicting the probability behavior for signal samples under different signal processing approaches.

The time-domain effect can also be illustrated through a probability graph (that is similar to a cumulative density function graph) that represents the probability of a sample (e.g., a time instance) exceeding a particular threshold. Thus, with reference to FIG. 3, a probability graph 300 is provided that includes probability curves depicting the probability behavior for signal samples under different signal processing approaches. Particularly, a curve 310 shows the probabilistic behavior for an unprocessed original signal (e.g., the input signal to a CFR system), in which samples can assume values up to the maximum value $S_{max}$. In contrast, a signal processed according a clip CFR approach (where signals levels above a threshold amplitude level of $S_{clip}$ are reduced/attenuated to the threshold level) will be associated with a probabilistic curve 320, where, due to the clipping functionality, a relatively large number of samples will be produced with the amplitude level $S_{clip}$. However, samples processed based on a packing approach, in which the spectrum of the output signal is controllably adjusted (or damaged) to pack the spectrum underneath the SEM curve will result is a sloped probabilistic behavior, as illustrated in an example SEM curve 330, in which the spectrum shaping CFR resultant signals have samples that can assume different values above a cutoff threshold, $S_{cutoff}$.

To increase the signal transmission power (e.g., to find an optimal PAPR for a specified/given EVM, or, vice versa, to determine an optimal signal EVM for a given PAPR (i.e., better EVM for a given PAPR)), in some embodiments, spectrum packing is implemented that controllably modifies the signal to be transmitted so that the spectral composition of the output signal more optimally fills up (uses up) the available area under an SEM envelope, but without exceeding or breaching it. An optimization procedure may be performed to find optimal characteristics of the CFR operation to be performed on the input signal (e.g., either through filtering applied to the input signal, or by subtracting a derived pulse from the input signal) that achieves optimal EVM for a given PAPR.

Different implementations may be realized to perform the optimization operations that result in an optimal (or near optimal) spectrum shaping CFR processing applied to the input signal. The optimization approaches that may be employed may be performed on a sample-by-sample basis. The optimization processing may operate, in some embodiments, as a background task. In some embodiments, the resultant optimization for a first sample may be used as one of the system characteristics based on which optimization operations in relation to a subsequent sample are performed (i.e., to determine a peak shape and amplitude for the next sample, with the modified sample having a spectral composition below a spectral mask such as SEM). For example, in one optimization approach, a finite set of filtering coefficients (or, alternatively, a finite set of subtraction pulses) may be considered and tested to identify the coefficient set, or the subtraction pulse, that achieves the best EVM (for a given PAPR) without breaching a pre-determined SEM envelope (such implementations may be realized, in some variations, using learning engines such as those implemented using neural network configurations like convolutional or recurrent neural networks). As noted, in some embodiments, to determine whether possible output signals breach the pre-determined SEM envelope, at least some of the input, intermediate, and/or output signals corresponding to the CFR processing may need to be transformed into a frequency domain representation (e.g., using FFT processing).

In another example of an optimization procedure, various CFR system attributes (as well as attributes of the overall communication system) may be specified, while one or more adjustable variables are tested with different values to identify, for example, the best EVM measurement that does not exceed the spectral envelope (defined by the SEM). For example, in implementations that are based on pulse subtraction approach to perform CFR processing, some variables or attributes that can be adjusted may include pulse length, number of peak trackers, number of CRF stages, hard clipping factor(s) (representing the amount of crest factor reduction in each of a series of stages), peak qualification window size (which determines the smallest time separation of peaks that are cancelled), number of iterations of shape optimization, number of starting shapes for the optimization (with a local iteration being performed to iteratively improve the shape), objective to be optimized, pulse shape factor (a number between 0 and 1 that is used to form a "smooth" discrete time function that mimics the shape of a bandpass filter spectrum for the band in which the pulse will be used), band stretch ratio (e.g., a number ρ between −1/2 and 1/2 which determines the factor (1+ρ) by which the basic spectrum band is stretched), band relative weight factor (a number, f, between 1/2 and 3/2 that is used for multi-band configurations to determine how to distribute compensation scale factor between two (or more) bands, etc. In embodiments in which the adjustable characteristics of the CFR system need to be optimized relatively quickly, a small number of variables may be used to test different values, with other characteristics of the CFR system (or of the overall communication systems) being set to specific values. Although limiting the overall number of adjustable characteristics that may be tested may result in an optimization performance that is inferior to what could have been achieved if there were more adjustable variables (and thus more degrees of freedom), the optimization performance may still yield improved spectral packing, and thus a more optimal performance than what could be achieved without spectrum packing.

Various objective functions may be used to quantify the quality of CFR processing that is to be used (be it through pulse subtraction or through attenuating filtering). In general, for CFR processing attributes/characteristics (corresponding to different specified, non-adjustable characteristics, which may include some specified PAPR, and the characteristics that can be adjusted to determine the optimal performance), an achieved EVM can be computed by processing the input sample using the adjustable processing characteristics (i.e., the characteristics being optimized) and the non-adjustable processing characteristics. In some embodiments, a software simulation of the CFR system behavior may be used. Starting points for the adjustable variables/parameters of the CFR system may be selected and different incremental or decremental values from those starting points for the adjustable variables/parameters can then be tested. In some embodiments, the optimization procedure may be performed iteratively, where the adjustable parameters are iteratively updated based on iterative computations of at least one objective function and continuing to update the values (in a particular direction) when the optimization function yields improved results from one iteration to the next.

In example embodiments in which the optimization of the spectrum shaping CFR processing is based on EVM and PAPR, the optimization procedure may be defined as follows. Consider an original input signal u(t) (denoted as u), where u has a high peak to average power ratio (denoted as $PAPR_u$), where output signals need to comply with a standard spectral emission mask denoted $SEM_{standard}$, and where an error vector magnitude, $EVM_T$, can be tolerated. In this example situation, the optimization objective may be defined as determining an output signal v(t) (denoted as v), such that v has a small peak to average power ratio (denoted $PAPR_v$), where |v-u|/|u| is equal to or less than $EVM_T$, and in which v complies with $SEM_{standard}$. This optimization process can be expressed as follows:

$$\text{minimize } PAPR(v) = \frac{\max(|v|)}{rms(v)}$$

$$\text{subject to: } \frac{|u-v|}{|u|} \leq EVM_T$$

$$SEM(v) < SEM_T$$

As noted, the above optimization procedure can be implemented by using pulse cancellation techniques (e.g., to generate optimized subtraction pulses that can be subtracted from u(t) to yield the desired v(t)), based on deriving optimized filtering parameters that are applied to u(t) to yield the desired v(t), or base don some other processing scheme. When seeking optimized subtraction pulses, pulse characteristics (e.g., pulse duration, pulse amplitude, etc.) that control the shape of the subtraction pulses can be varied to find subtraction pulses that, when subtracted from u(t), will yield the desired v(t). The implementations described herein may thus allow to determine and control the pulse definition that achieve the optimization objective. In the example of pulse cancellation technique, the determined pulses are optimized to result in minimal damage to EVM and to take advantage of a broad (liberal) SEM. It is noted that in embodiments involving conventional CFR processing, the focus is generally on the pulse energy in-band, which improves ACPR, but results in a worse EVM. On the other hand, in the spectrum shaping CFR processing implementations described herein the focus is on the out-of-band energy which improves EVM (although may degrade ACPR) but conforms to a given SEM. As also noted, other optimization objective criteria may be used in the optimization process.

In some embodiments, the optimization processes may be performed offline. In such embodiments, the optimization is run on a remote processor device with access to substantially (or even all) the available samples. In that approach, available samples are optimized simultaneously, and the FFT of the whole waveform is available to enforce the SEM constraint. Using this approach, a large optimization problem can be solved offline. Alternatively, in some embodiments, the optimization processes may be performed online (e.g., the processing is performed locally on the device performing the spectrum shaping CFR processing). This approach may be used in conjunction with a pulse-subtraction CFR implementation. During online processing, pulse properties, such as shape, length, etc., can be determined. The pulse is optimally (or near-optimally) calculated to conform to the SEM constraint. When the derived pulse is applied in the subtraction operation, it will generally satisfy the SEM constraint. The offline processing generally provides better optimization results (mathematically), with the online approach providing an approximation of the results that can be obtained from the offline approach. In some implementations, observations from the online approach may be used in situations where, for example, some of the smaller peaks need to be expanded or emphasized.

Figure 4:
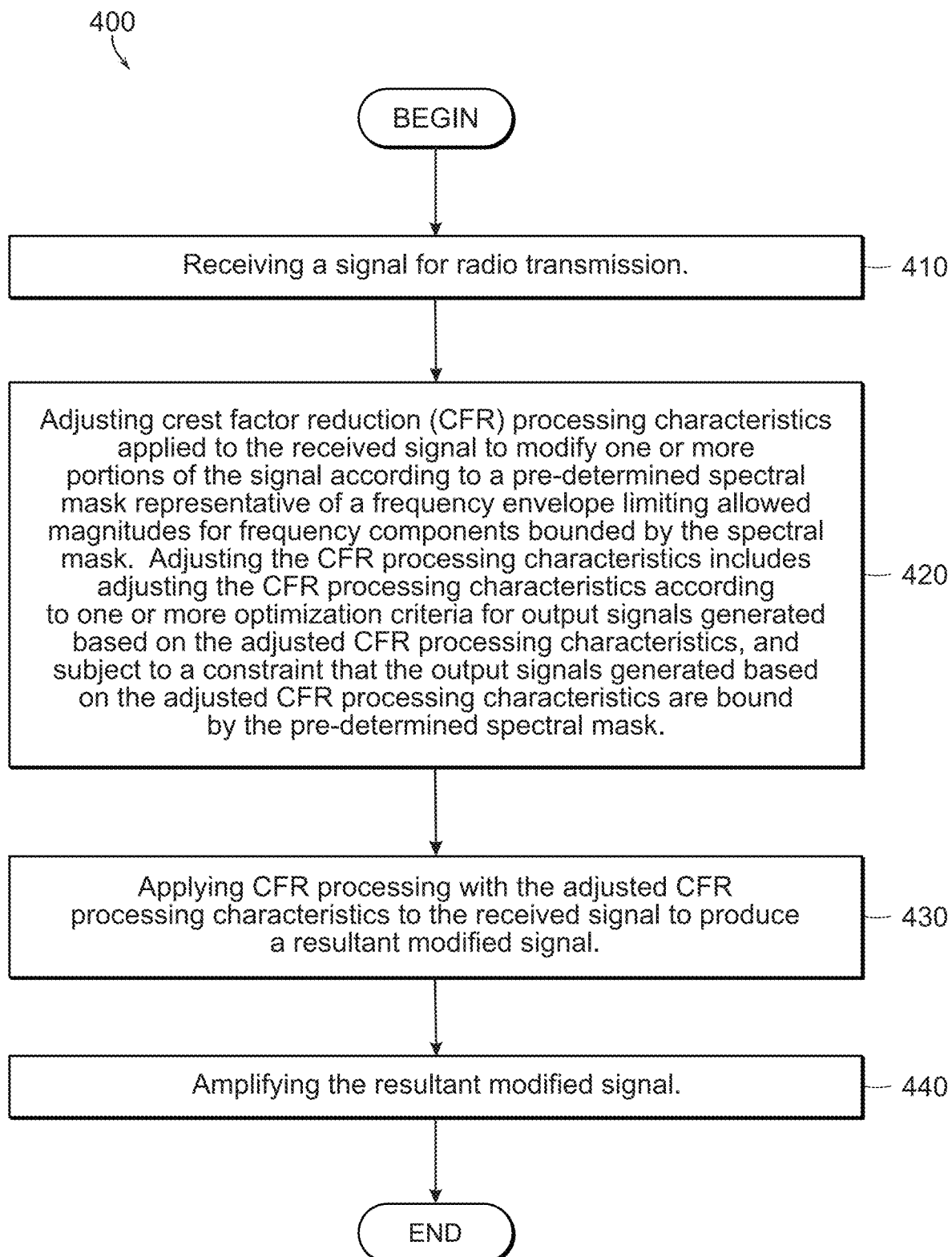
FIG. 4 is a flowchart of an example spectrum shaping crest factor reduction (CFR) procedure.

With reference now to FIG. 4, a flowchart of an example procedure 400 to facilitate implementation of spectrum shaping CFR processing, is shown. The procedure 400 may be performed at a network node (such as a WLAN access point) or at a mobile device in communication with a network node. The procedure 400 includes receiving 410 a signal for radio transmission, and adjusting 420 crest factor reduction (CFR) processing characteristics applied to the received signal to modify one or more portions of the signal according to a pre-determined spectral mask representative of a frequency envelope limiting allowed magnitudes for frequency components bounded by the spectral mask. Adjusting the CFR processing characteristics includes adjusting the CFR processing characteristics according to one or more optimization criteria for output signals generated based on the adjusted CFR processing characteristics, and subject to a constraint that the output signals generated based on the adjusted CFR processing characteristics are bound by the pre-determined spectral mask.

In some embodiments, adjusting the CFR processing characteristics (be it pre-determined pulses that are to be subtracted from signals at approximately the locations of detected peaks, impulse responses of FIR filters optimized subject to the spectral mask constraint, or some other CFR characteristics) according to the one or more optimization criteria for the output signals generated based on the adjustable CFR processing characteristics may include producing the optimized resultant modified signal according to a criterion that minimized a computed error vector magnitude (EVM) for the resultant modified signal for a given peak-to-average power ratio (PAPR). In some embodiment, adjusting the CFR processing characteristics according to the one or more optimization criteria for the output signals generated based on the adjustable CFR processing characteristics may include producing the resultant modified signal according to a criterion that minimizes a given peak-to-average power ratio (PAPR) for a given error vector magnitude (EVM) for the resultant modified signal. In such embodiments, producing the optimized resultant signal may include determining a resultant signal v(t), produced through crest factor reduction operations, from an input signal u(t) such that v(t) has a small peak to average power ratio ($PAPR_v$), where |v-u|/|u| is equal to or less than $EVM_T$, and in which v complies with a predetermined spectral emission mask $SEM_T$. In some such examples, determining the resultant signal v(t) may be performed according to an optimization process:

$$\text{minimize } PAPR(v) = \frac{\max(|v|)}{rms(v)}$$

subject to: $\frac{|u-v|}{|u|} \leq EVM_T$, and $SEM(v) < SEM_T$.

In some embodiments, adjusting the CFR processing characteristics according to the one or more optimization criteria may include selecting one or more CFR processing characteristics from a list of controllable attributes that includes at least one of pulse length, number of peak trackers, number of CRF stages, at least one hard clipping factor representing the amount of crest factor reduction in each of a series of stages, peak qualification window size representative of a smallest time separation of peaks that are cancelled, number of iterations of shape optimization, number of starting shapes for the optimization, objective to be optimized, pulse shape factor with a value between 0 and 1 that is used to form a smooth discrete time function that mimics the shape of a bandpass filter spectrum for the band in which the pulse will be used, a band stretch ratio with a value ρ between −1/2 and 1/2 which determines the factor (1+ρ) by which the basic spectrum band is stretched, and/or band relative weight factor with a number f between 1/2 and 3/2 that is used for multi-band configurations to determine how to distribute compensation scale factor between two or more bands). In such embodiments, the procedure may further include assigning pre-determined values to non-selected CFR processing characteristics from the list of controllable attributes, and iteratively computing values for the selected one or more CFR processing characteristics, based on the non-selected CFR processing characteristics assigned with the pre-determined values, that achieve spectrum packing inside the pre-determined spectral mask.

With continued reference to FIG. 4, having determined the adjusted CFR processing characteristics that can achieve an optimized resultant output signal (e.g., based on some objective/optimization criterion), the procedure 400 further includes applying 430 CFR processing with the adjusted CFR processing characteristics to the received signal to produce a resultant modified signal, and amplifying 440 (e.g., processing the modified signal with a transmit chain that includes at least one power amplifier) the resultant modified signal (the amplified signal can then be communicated to a remote device).

In some implementations, applying the CFR processing with the adjusted CFR processing characteristics may include attenuating the received signals using the CFR processing with the adjusted CFR processing characteristics to produce the resultant modified signal (i.e., the CFR processing may be realized using a processor-based implementation, a dedicated circuit implementations, a programmable circuit implementation, etc.) to perform a filtering operation(s) that results in the modified signal whose spectral composition controllably (and efficiently) fills the area under some pre-defined spectral envelope (the SEM line). The resultant signal may generally be a clipped version of the input signal, with possibly some shaped portion of the signal protruding above a clipping threshold value (the protrusion will have a shape and amplitude determined through the optimization process).

Figure 5:
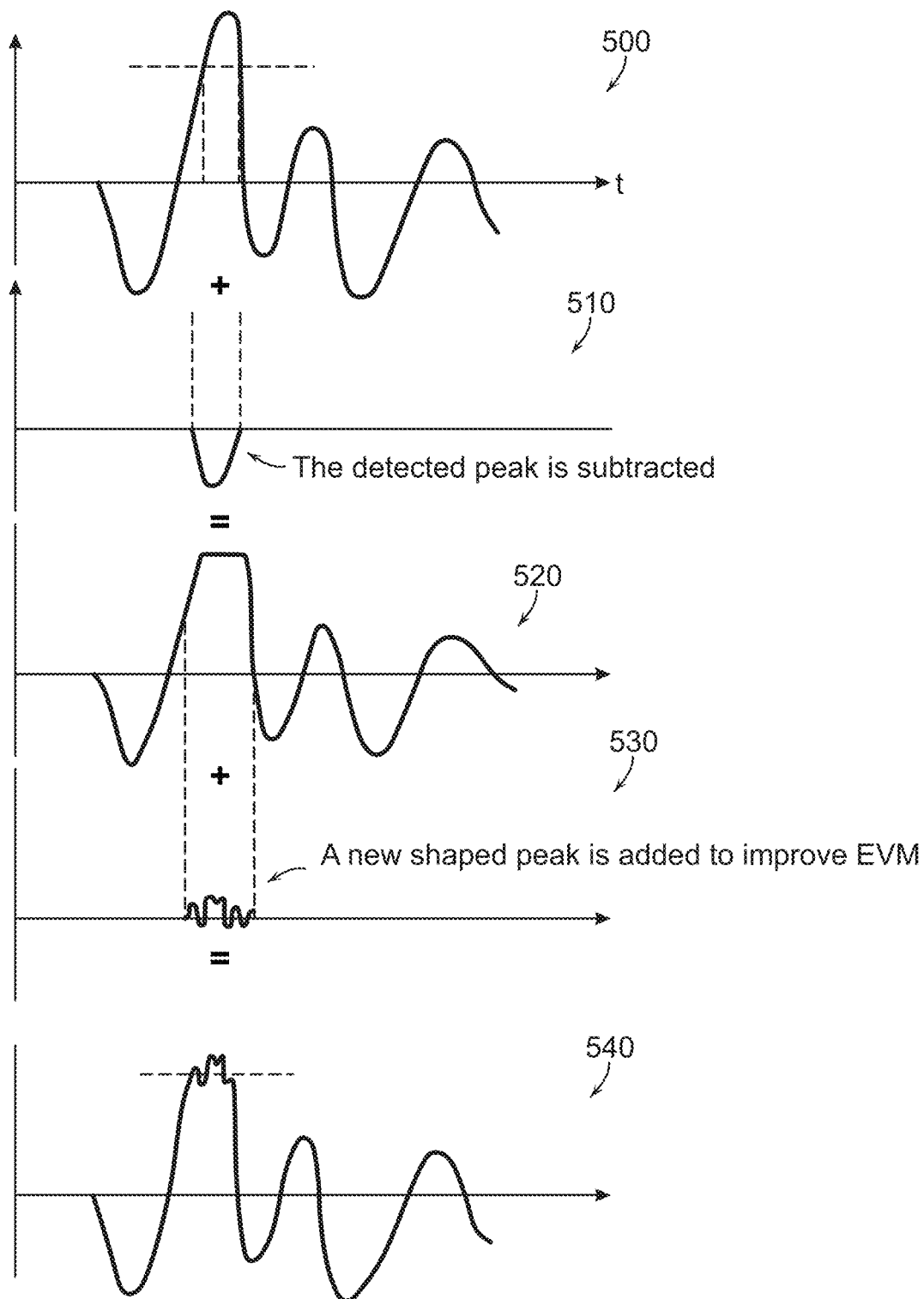
FIG. 5 are graphs showing a sequence of operations to perform pulse subtraction in a spectrum shaping CFR system.

In some embodiments, applying the CFR processing with the adjusted CFR processing characteristics may include generating a subtraction pulse using the adjusted CFR processing characteristics based, at least in part, on the received input signal, and subtracting the subtraction pulse from the received signal to produce the resultant modified signal. Generating the subtraction pulse may include adjusting one or more pulse properties defining the subtraction pulse such that the modified signal resulting from subtracting the subtraction pulse substantially optimally occupies the spectral space under the spectral envelope. In some examples, adjusting the one or more pulse properties may include adjusting one or more of, for example, a pulse shape, and/or a pulse length. In such embodiments, the implementation of a pulse subtraction circuitry may also be realized using dedicated circuit to generate a pulse, and using a summation circuit (that can reverse the polarity of the signal to a value opposite that of the input signal) to cause the pulse subtraction operations. In some embodiments, the pulse subtraction circuitry may also be realized using a programmable processor, a DSP processor, application-specific integrated circuits (ASIC), etc. FIG. 5 includes graphs 500, 510, 520, 530, and 540 showing a sequence of operations to perform pulse subtraction (e.g., subtracting a peak and/or adding a new shaped peak) in a CFR system such as the spectrum shaping CFR systems and other implementations described herein.

Figure 6:
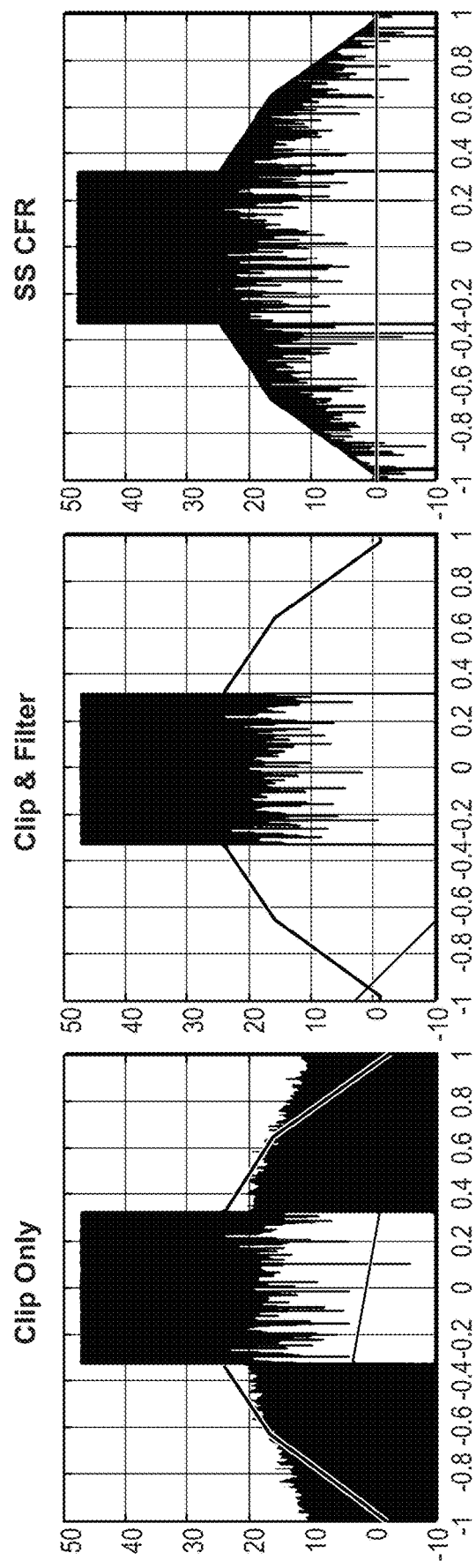
FIGS. 6 and 7 are graphs and tables providing comparisons of processing performances using different CFR approaches.
Figure 7:
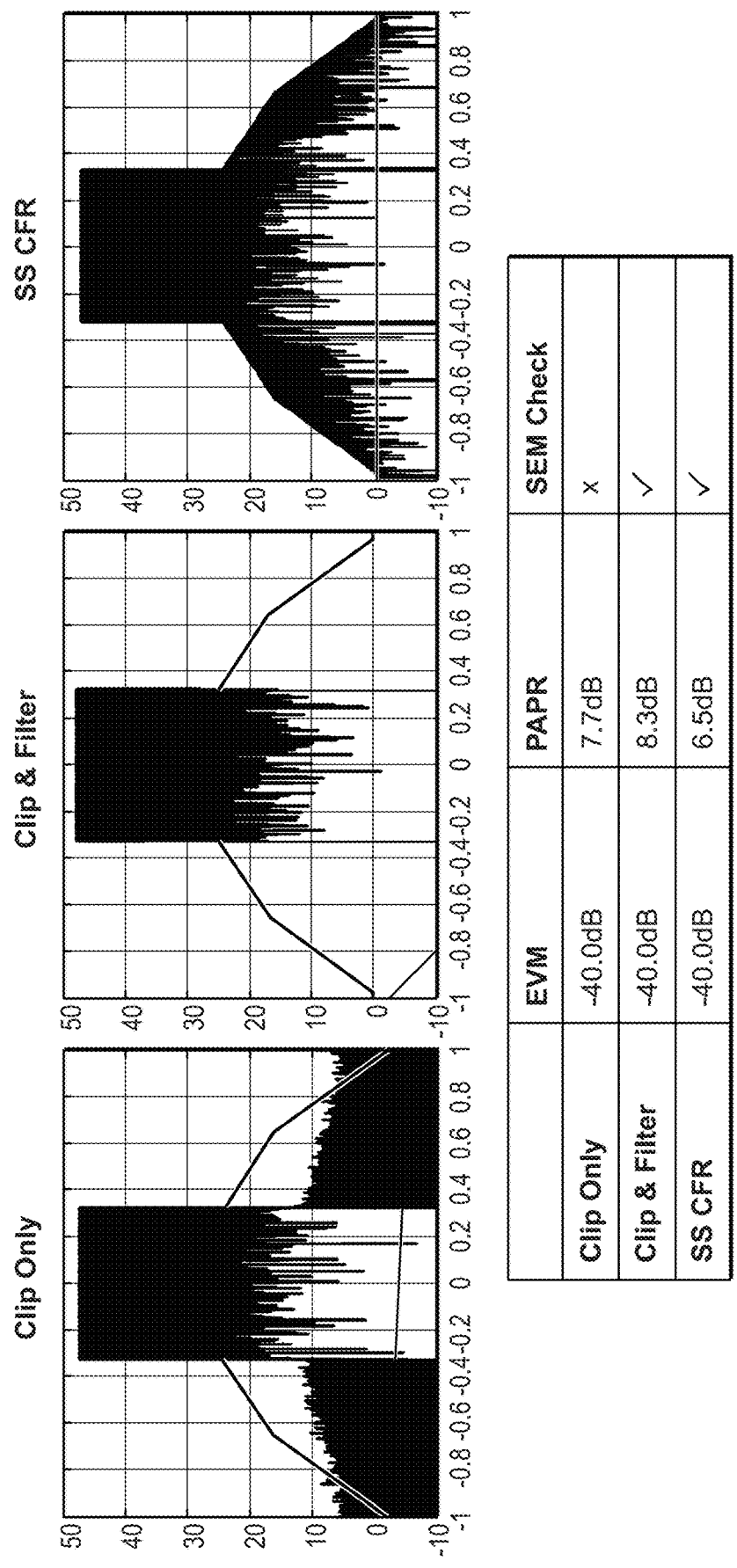
Figure 8:
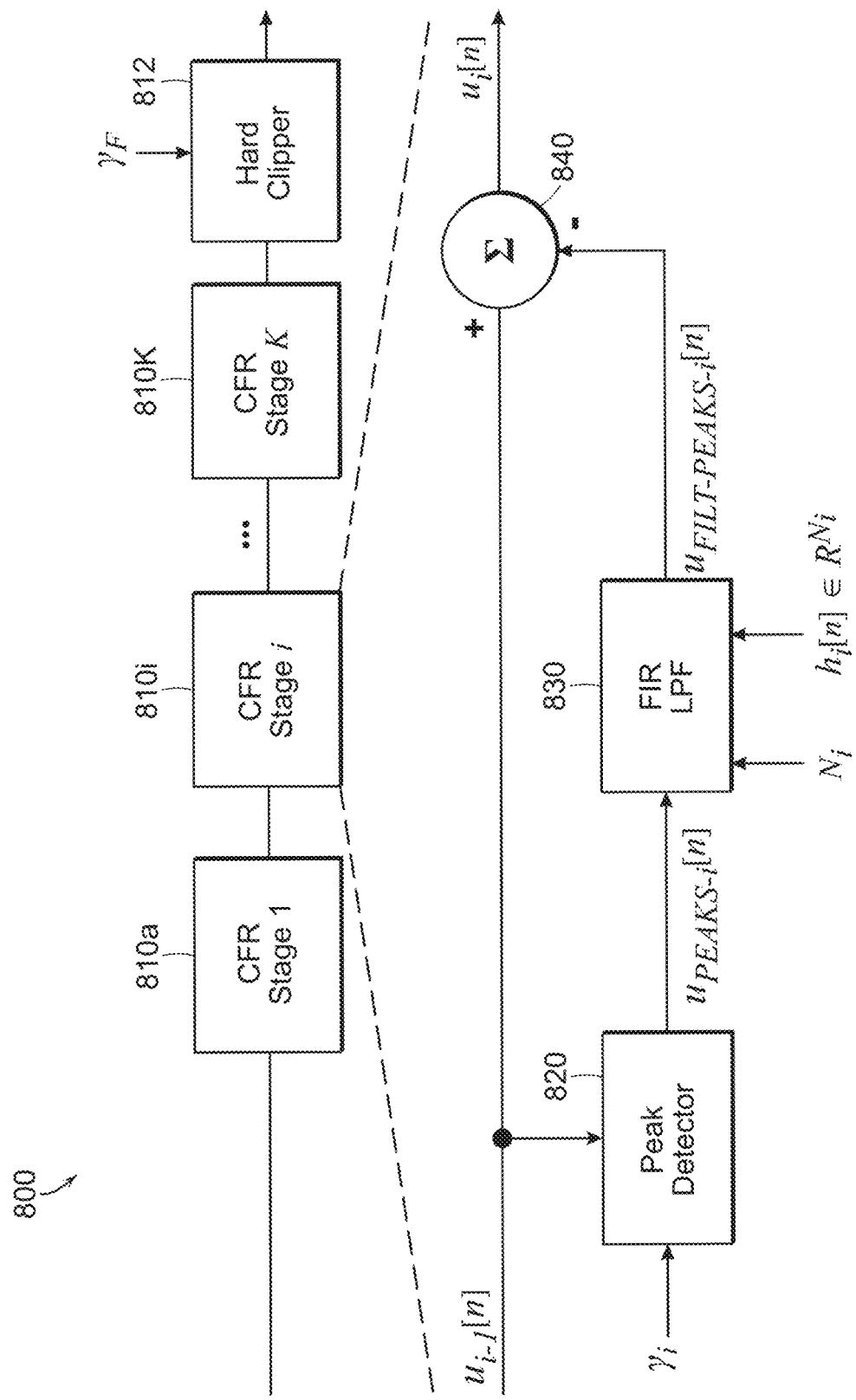
FIG. 8 is a block diagram of an example CFR architecture that may be realized to implement spectrum shaping CFR processes.

In some examples, applying the CFR processing with the adjusted CFR processing characteristics may include processing the received signal by a filter chain comprising one or more CFR stages (e.g., the chains comprising the CFR stages 810a, 810i and 810K depicted in FIG. 8) that each includes a respective peak detector (such as the peak detector 820 of FIG. 8) coupled, at an output of the respective peak detector, to a respective finite impulse response (FIR) filter (such as the filter 830 of FIG. 8) with adjustable coefficients optimized subject to the constraint that the output signals generated at an output of the filter chain are bound by the spectral mask. In some embodiments, the filter chain may further include a downstream hard clip module (such as the module 812 of FIG. 8) coupled to a downstream output of the one or more CFR stages (i.e., the output of the final FIR-based stage). In some examples, processing the received signal by the filter chain may include generating, by the respective peak detector, based on a respective CFR-stage input signal to the respective one or more CFR stages, a center-clipped signal representing samples of the respective CFR-stage input signal with a magnitude greater than $\gamma_i$, where $\gamma_i$ is a clipping threshold for the respective peak detector of the respective one or more CFR stages. In some embodiments, generating the center-clipped signal may be computed according to:

$$u_{PEAKS-i}[n] = u_{i-1}[n] - \frac{u_{i-1}[n]}{\max\left(1, \frac{|u_{i-1}[n]|}{\gamma_i}\right)}$$

where $u_{PEAKS-i}[n]$ is the center-clipped signal, i is a respective stage number of the respective one or more CFR stages, and $u_{i-1}[n]$ is the respective CFR-stage input signal to the respective one or more CFR stages. FIGS. 6 and 7 include graphs and tables providing comparisons of processing performances using different CFR approaches (clip only, clip and filter, and spectrum shaping CFR). FIG. 6 provides the performance comparison for an EVM target of −30 dB, while FIG. 7 provides the performance comparison for an EVM target of −40 dB. As shown, the use of the spectrum shaping CFR approach provides improved performance (e.g., in terms of PAPR) compared to the other two approaches.

With reference next to FIG. 8, a block diagram of an example CFR architecture 800 that may be realized to implement the spectrum filling (spectrum shaping) processes described herein is shown. As illustrated, the example architecture 800 includes multiple sequential CFR stages 810a-K. In some embodiments, a further hard clipper stage 812 (with a hard-clipping threshold $\gamma_F$) may be included to apply a hard clipping operation (e.g., instead of the filtering performed in earlier stages, or pulse subtraction operations performed in other example implementations) on the crest factor reduced signal processed by the $K^{th}$ CFR stage (shown in FIG. 8 as the last CFR stage in the chain/cascade of CFR stages).

The processing performed by the various stages is more particularly illustrated in relation to the CFR stage i (i.e., implemented in unit 810i). As shown, the circuitry of the $i^{th}$ CFR stage, 810i, receives the input signal $u_{i-1}[n]$ (i.e., the output of the CFR stage preceding the stage). A peak detector 820 is configured to detect the peaks of the incoming input signal $u_{i-1}[n]$, to produce the signal $u_{PEAKS-i}[n]$, which may be a center-clipped signal representative of the excess magnitude (absolute amplitudes) of the peaks of the input samples (to the respective stage) above the respective threshold $\gamma_i$ for the respective peak detector for the CFR stage. In some embodiments, the peak detector may generate one or more center-peaked signals upon detection of a sample of $u_{i-1}[n]$ exceeding a predetermined threshold ($\gamma_i$, where i corresponds the particular CFR stages in operation, such that different CFR stages may have different predetermined peak thresholds). An example peak detection function that may be used in some implementations is:

$$u_{PEAKS-i}[n] = u_{i-1}[n] - \frac{u_{i-1}[n]}{\max\left(1, \frac{|u_{i-1}[n]|}{\gamma_i}\right)}$$

The above peak detection may be configured to not only identify local peaks in the signal, but (e.g., through adjustment of the threshold used by the peak detection function) track the shape of the signal (e.g., based on samples whose magnitude exceeds the pre-determined threshold).

The peaks signal (e.g., comprising of one or more samples) is then provided to an FIR filter 830 configured to apply an optimized impulse responses to the incoming impulse stream (rather than scale a pre-determined signal that is to be subtracted from the input signal at approximately the detected peak location(s) of the signal). For example, the FIR filter 830 may be configured to generate, in response to a received center-clipped samples stream (generated by the respective peak detector) corresponding to the excess magnitude of detected peaks (exceeding a threshold $\gamma_i$) of the signal $u_{i-1}[n]$ an output signal that, when added (e.g., using an adder 840) to the input signal $u_{i-1}[n]$ for that stage, results in a signal $u_i[n]$ whose peaks have been reduced and whose spectral content (of the signal $u_i[n]$) is diffused to more efficiently to fill the spectral mask (such as the spectral masks 120 or 220 of FIGS. 1 and 2, respectively). While FIG. 8 indicates the FIR filter 830 to be a lowpass filter, other filter behaviors (e.g., represented through different frequency responses) may be implemented by that filter (e.g., bandpass, highpass, or any other filter behavior). Thus, in some embodiments, the filter design (e.g., coefficients associated with delay elements used to implement an FIR filter) of the filter 830 for the particular stage may be optimized (e.g., dynamically adjusted at various times, or dynamically adjusted based on signal characteristics of the incoming signal) to cause not only crest factor reduction of the input signal, but to more efficiently spread the spectral content of the resultant output signal for that CFR stage in accordance with the particular spectral mask that is to be used. As noted, in some embodiments, the CFR architecture comprises multiple stages, thus allowing for implementations in which the level at which the signal is progressively reduced from stage to stage to progressively meet the target signal spectral shape that achieves the spectral filling in the area under the spectral envelope. An advantage of the architectural implementation depicted in FIG. 8 is its simplicity, using, for a particular stage, one FIR filter in conjunction with a peak detector, rather than needing to use multiple arrangements of peak trackers and pulse scaling elements.

With continued reference to FIG. 8, the filter 830 (for a particular stage i) is characterized by the order number, $N_i$ (i.e., the length (size, width) of the FIR filter), and by an impulse response $h_i[n] \in R^{N_i}$ (which, as noted may be optimized dynamically or at an earlier design-time/calibration-time process). The optimization may be achieved by computing filter coefficients for some pre-defined system characteristics (e.g., system characteristics such as the filtering window type (for example, a truncated sinc function window, or some other window function type), number of window taps, stage order distribution, etc.) Table 1, below, provide an example of the stage characteristics for a 3-stage CFR architecture (more or fewer stages may be used for a particular implementation, depending, for example, on the complexity desired, and/or the complexity of the spectral emission mask defining the constraints for the optimization problem that it to be solved).

TABLE 1

| Stage i | Threshold $\gamma_i$ | Order ($N_i$) | Impulse Response $h_i[n]$ |
| --- | --- | --- | --- |
| 1 | 0.6 | 21 | $h_1[n] \in R^{21}$ |
| 2 | 0.6 | 7 | $h_2[n] \in R^7$ |
| 3 | 0.6 | 3 | $h_3[n] \in R^3$ |

In some examples, the order (size/width) of the FIR filters may decrease for downstream stages (thus reducing the complexity of the filters, and allowing for simplified optimization problems for the later stages) since the original signal will progressively have fewer peaks or distortions as it advances through the upstream stages. That is, the incoming signal to be processed (i.e., at the very first stage) will generally have the most peaks that need to be reduced to mitigate non-linearity issues. Thus, a higher order filter (e.g., $N_1=21$) may be used for the first CFR stage. Downstream stages may, in some embodiments, use progressively lower order filters ($N_2=7$, and $N_3=3$ in the above example). This may allow, in some embodiments, for designing the upstream stages to more aggressively remove or reduce peaks, while downstream CFR stages, that have lower order filters and thus may be easier to optimize for a constraint such as the spectral emission mask constraint discussed herein, may be implemented to achieve the filling of the spectral emission mask objective. The filter output at each stage, responsive to the detected signal $u_{PEAKS-i}$, can be represented as:

$$u_{FILT-PEAKS-i}[n] = \sum_{k=-L/2}^{k=L/2} h_i[k] u_{PEAKS}[n-k]$$

where the length of the filter $h_i[n]$ is L+1.

While the above multi-stage FIR-based CFR processing may be used to realize the various processes discussed herein (e.g., to implement the procedure 400), as noted above, these processes can also be implemented based on other CFR architectures and approaches. For example, the multi-stage CFR processing can be realized using an arrangement of one or more peak trackers with one or more pulse shaping elements, with that arrangement replacing the FIR unit in each stage. Such an architecture can be used to achieve CFR processing through shaped pulse subtraction of pre-defined (or dynamically generated) pulses that are added approximately at locations of detected peaks in a signal.

Figure 9:
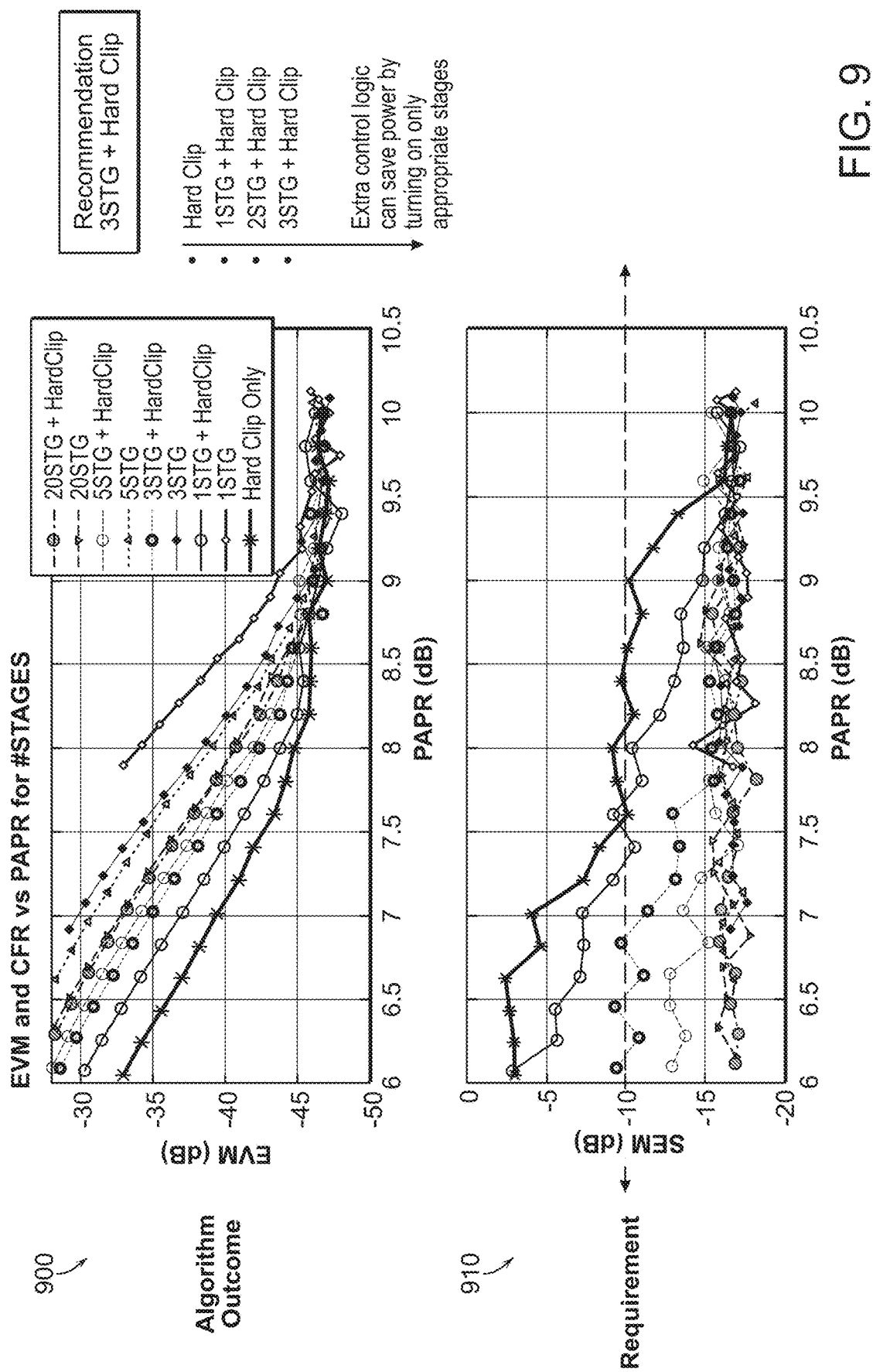
FIG. 9 includes graphs comparing performance results using different types of FIR-based CFR architectures.

FIG. 9 includes graphs 900 and 910 comparing performance results using different types of FIR-based CFR architectures. Particularly, the graphs 900 and 910 compare the performances achieved using: 1) an architecture comprising an ideal filter, 20 CFR stages, and a hard clipper, 2) an architecture comprising an ideal filter and 20 CFR stages, 3) an architecture comprising an ideal filter, 5 CFR stages, and a hard clipper, 4) an architecture comprising an ideal filter and 5 CFR stages, 5) an architecture comprising an ideal filter, 3 CFR stages, and a hard clipper, 6) an architecture comprising an ideal filter and 3 CFR stages, 7) an architecture comprising an ideal filter, 1 CFR stage, and a hard clipper, 8) an architecture comprising an ideal filter and 1 CFR stage, and 9) an architecture comprising a hard clipper. The experiment in which the performances for these different architectures were evaluated used a signal with a bandwidth of 80 MHz, and a sampling rate of 491.52 Msps. The EVM was measured using a spectrum analyzer, where the EVM floor was −47 dB, and the original signal had a PAPR of around 10 dB.

Figure 11:
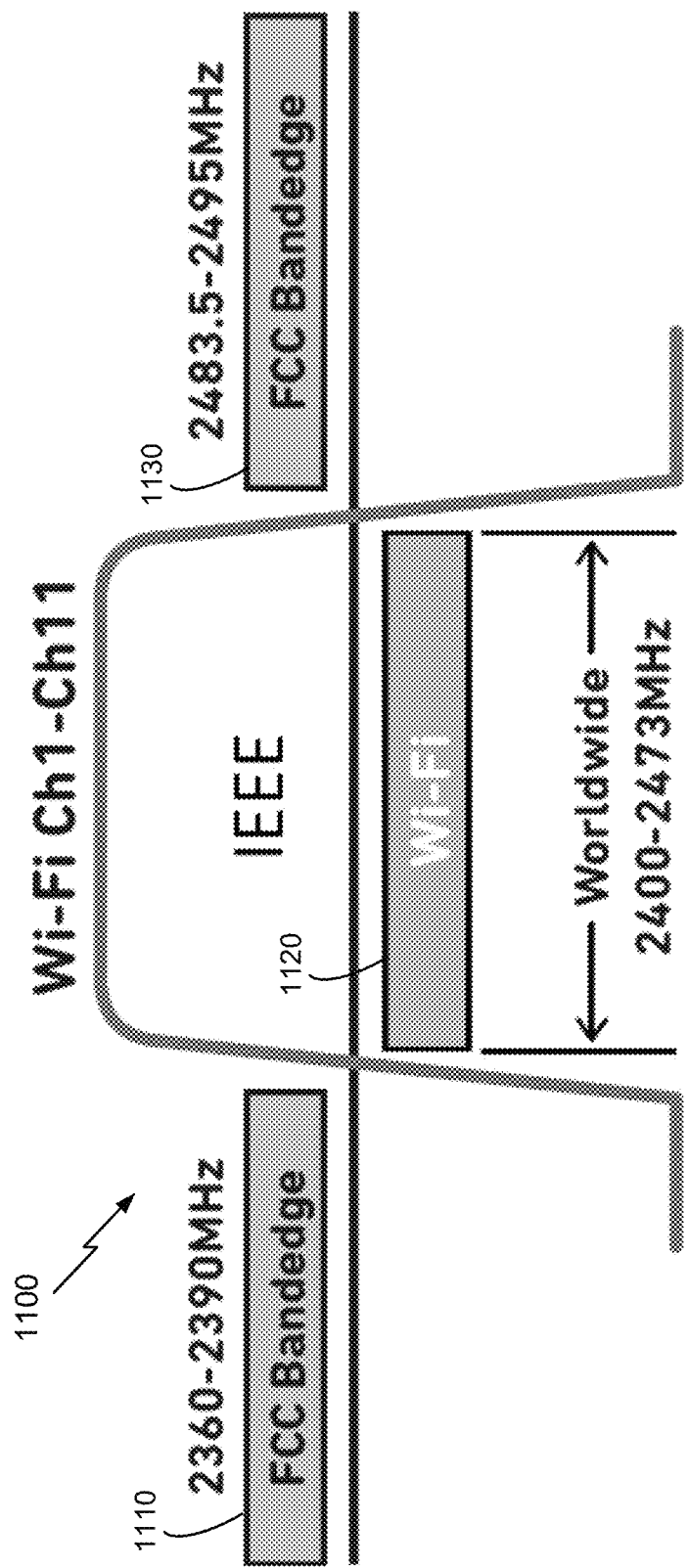
FIG. 11 is a diagram depicting RF band allocation in an RF range of 2360-2495 MHz.

In some examples, the specific definitions or characteristics of the masks may be based on spectral behavior constraints caused as a result of multiple regulatory requirements affecting adjacent/neighboring RF ranges. For example, in the United States, certain radio frequency bands (within some frequency range) may be reserved or allocated (e.g., by a regulatory service such as the Federal Communication Commission, or FCC) for particular uses (e.g., LTE bands for operations by a particular carrier), while other bands may be allocated for other radio frequency services (e.g., wireless LAN services, such WiFi-based communication technologies). FIG. 11, for example, includes a diagram 1100 depicting an RF allocation in the RF range of 2360-2495 MHz). This RF range includes a first allocated RF portion, corresponding to an FCC bandedge 1110, with frequencies of 2360-2390 MHz, followed by a WiFi spectrum portion 1120 that corresponds to WiFi bands (Channels 1-11, covering the RF range of 2400-2473 MHz), followed by another FCC bandedge portion 1130 corresponding to the frequency range of 2483.5 to 2495 MHz.

Figure 12:
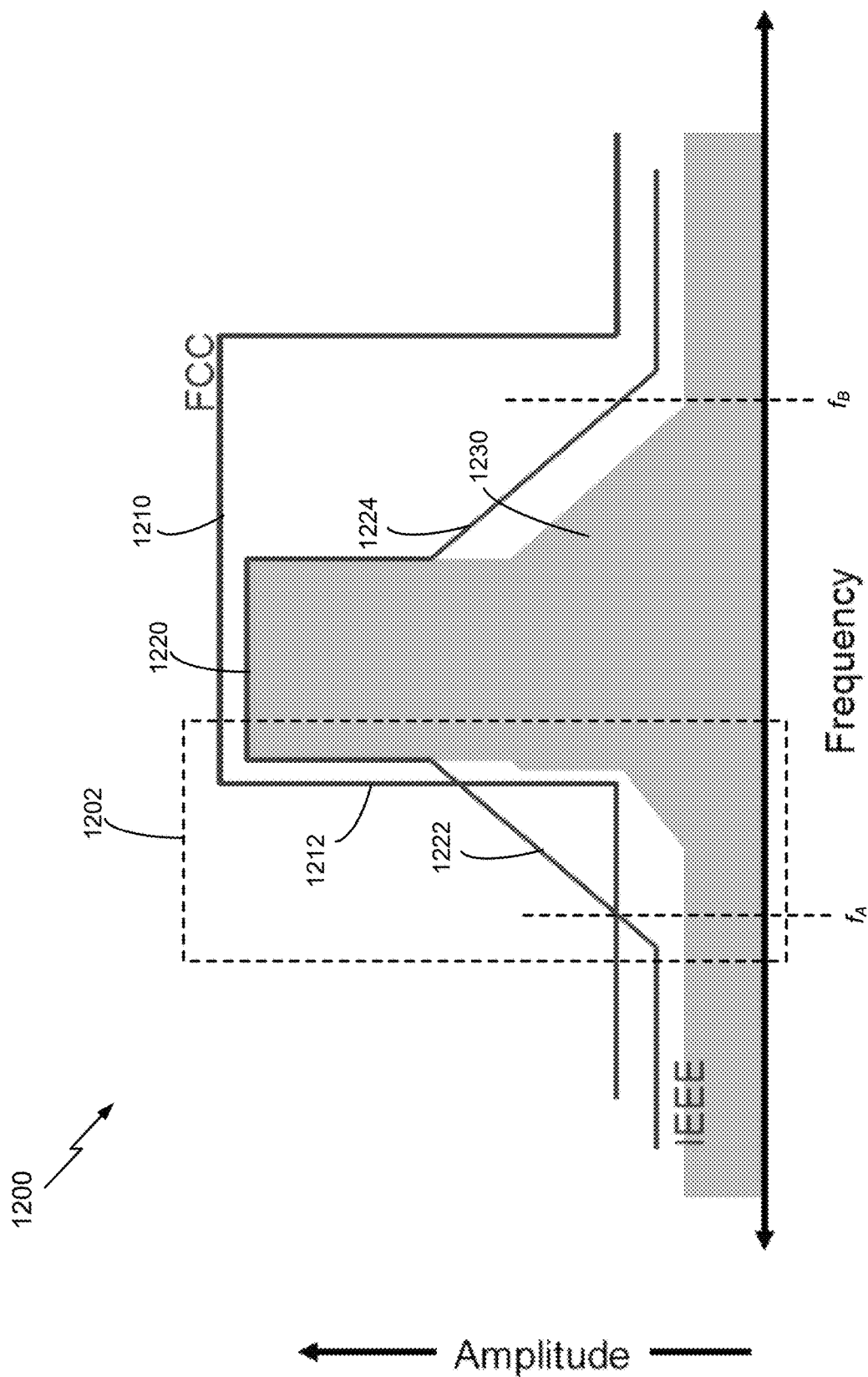
FIG. 12 is a diagram illustrating a spectral mask with FCC spectral requirements around WiFi band frequencies, and a spectral emission mask corresponding to the allowed spectral behavior for a WiFi channel.

In some situations, communication systems and devices that operate in channels close to the boundaries/edges of spectrum bands may be subject to different spectral behavior requirements. For example, when a device operates in WiFi channel 1 (i.e., close to the FCC bandedge 1110 of FIG. 11), the device/system needs to conform to both the FCC regulatory requirements restricting how much power leakage is permitted into the bandedge band 1110, and also has to conform to the IEEE spectral requirements corresponding to the channel. FIG. 12 is a diagram 1200 illustrating a spectral mask 1210 of the FCC spectral requirements around WiFi band frequencies, and a spectral emission mask 1220 corresponding to the allowed spectral behavior for a WiFi channel. As shown, the mask 1220 allows a more relaxed (gradual) spectral tapering in a spectral region 1202 (within which the carrier frequency of a transmitting wireless device may be located) as represented by the sloped line 1222. On the other hand, under the more stringent spectral mask 1210 (representative of FCC requirements spectral requirements for the frequency range covered by the diagram 1200), the allowed power behavior in the left side of the region 1202 is such that the amplitude of lower spectral components needs to be reduced to a lower amplitude level very sharply/quickly, as represented by the vertical line 1212.

If the device/system is implemented so that its spectral behavior meets both sets of requirements on both sides of the carrier (e.g., implementing a symmetric spectral mask according to the more stringent of the two sets of regulatory requirements, which in this case would be the FCC requirements), the realized behavior would become overly aggressively and overly engineered. Instead, in some embodiments, device behavior, including CFR and DPD behaviors that are associated with spectral behavior that may span a spectral range falling into spectral regions governed by different spectral requirements, can be configured to meet an asymmetrical behavior. For example, the behavior of a CFR implementation, when the device operates at or near a bandedge (such as WiFi channel 1 operating at the edge of the regions 1120 of FIG. 11, near the FCC bandedge 1110), may be such that the spectral response of CFR filtering meets relatively strict FCC requirements at the lower frequencies of the bands (i.e., on the left-hand-side of its frequency response), but is allowed to meet the less stringent IEEE spectral requirements at the higher frequencies of the band. It is to be noted that in the example of FIG. 12, beyond the frequency $f_B$, as well as below the frequency $f_A$, the more stringent spectral requirements are imposed by the IEEE mask 1220. Thus, the spectral behavior of such a system implementation would need to meet the more stringent FCC requirements at the lower part of the spectral region (e.g., would need to meet the requirements represented by the vertical line 1212), but would only need to conform to the more relaxed, sloped, spectral requirements at a higher part of the frequency region (would need to meet the requirements represented by the sloped line 1224). A Resultant asymmetrical spectral behavior adhering to the different requirement at different parts of the spectrum is represented by the shaded region 1230.

Furthermore, because the specific local spectral requirements vary according to where the system or device is processing RF signals, the location of the particular band of operation at which the device/system is operating can be used, in some embodiments, to determine the spectral constraints that will need to be observed. Thus, for example, if a device is operating at a WiFi band close to bands reserved for other RF services (e.g., the device is operating at WiFi channel 1, close to the LTE bands corresponding to the FCC bandedge 1110), the spectral power requirements for operation of the device may be based on a composite spectral mask selected according to the more stringent requirements at different frequencies at which the device/system is configured to operate (e.g., the resultant mask will be one that will result in the asymmetrical frequency behavior represented by the shaded region 1230 of FIG. 12). On the other hand, if the device/system is operating at a band or channel that is closer to the middle of a frequency region (e.g., at one of the middle WiFi channels within the WiFi spectrum portion 1120 depicted in FIG. 11), the device/system operation will need to conform to only one set of regulatory spectral requirements (in this case IEEE requirements, and the resultant spectral behavior will be one bound by a mask similar, for example, to the mask 1220 of FIG. 12. Thus, in some embodiments, a CFR system is provided that includes a controller (e.g., a programmable controller such as a microprocessor) to receive a signal (e.g., via an RF transceiver) for radio transmission, and to configure crest factor reduction (CFR) processing characteristics to apply to the received signal to modify one or more portions of the signal based on an asymmetrical spectral mask (with the asymmetry resulting, for example, because the particular band(s) corresponding to the received signals are located near frequencies requiring processed signals to conform to two or more different regulatory requirements) representative of an asymmetric frequency envelope limiting allowed magnitudes for frequency components bounded by the asymmetrical spectral mask, with the asymmetrical frequency mask being defined based on spectral characteristics specified by multiple regulatory radio frequency (RF) power requirements at frequencies affecting a frequency range of the asymmetrical spectral mask. The controller is also configured to apply CFR processing to the received signal according to the configured CFR processing characteristics to produce a resultant output signal with a resultant spectral representation bound by the asymmetrical spectral mask.

In some examples, the CFR system's controller may be further configured to determine a spectral band for operation of the CFR system. In such examples, the controller may be implemented to configure CFR processing characteristics based on the determined spectral band to modify one or more portions of the received signal based on a respective, band-related, asymmetrical spectral mask associated with the determined spectral band. For example, such CFR processing may be implemented by having the controller select, based on the determined spectral band, one of a plurality of pre-determined CFR filters.

In some implementations, the CFR processing may be implemented using digital filter elements (to realize FIR filters), and/or via a programmable processor to implement digital processing. The digital filter elements may be realized using programmable arrays comprising delay elements (memory cells or buffers) and multiplication coefficients. The CFR system additionally includes an amplifier (e.g., a power amplifier, typically exhibiting non-linear behavior that can be remedied, in part, through digital predistortion operations) to amplify the resultant output signal.

Figure 13:
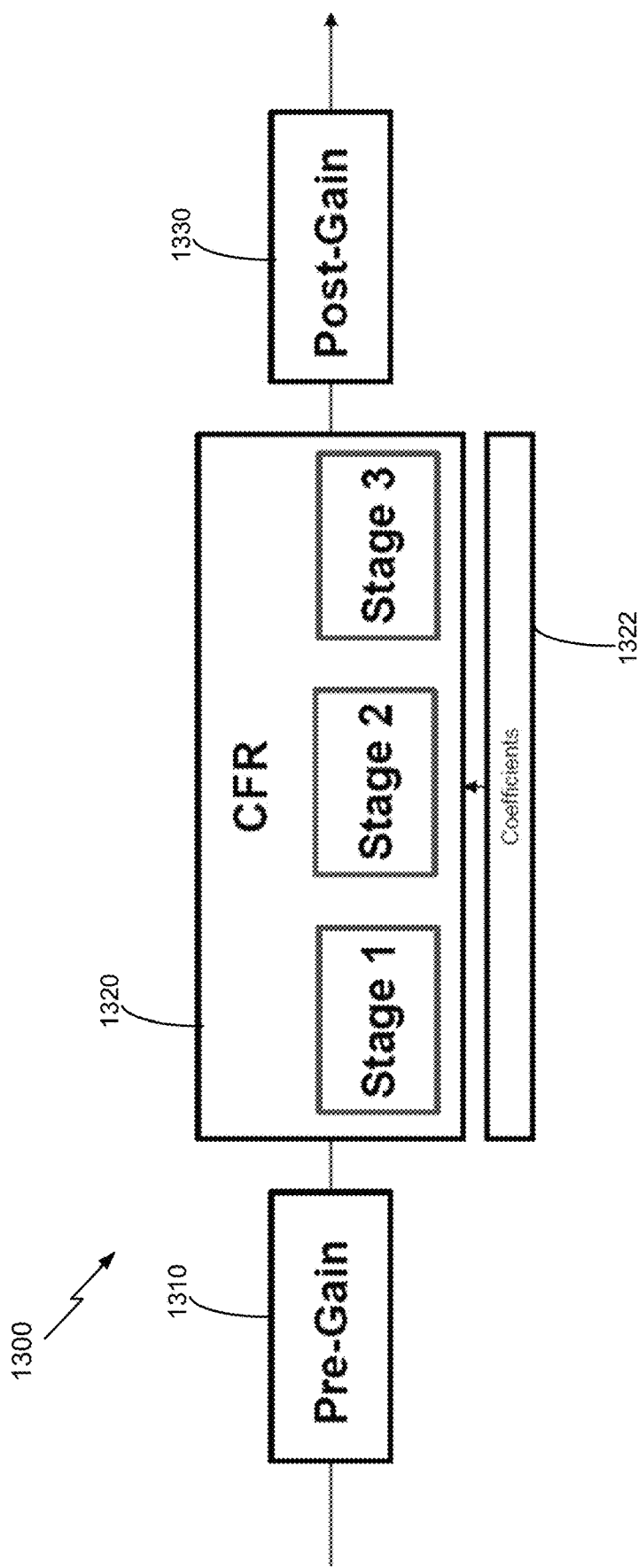
FIG. 13 is a block diagram of an example CFR system.

With reference next to FIG. 13, a block diagram of an example CFR system 1300 configured to implement CFR operations conforming to spectral constraints (that may depend on a particular band that the CFR system is to operate in) is shown. The CFR system 1300 includes a pre-gain section/unit 1310, a CFR section 1320, and a post-gain 1330. The pre-gain section 1310 is configured to perform various pre-processing operations on a received signal, such as noise reduction filtering, as well as other types of signal processing, including, for example, digital predistortion processing, which may be performed independently, or in conjunction with, the CFR processing described herein. Further details regarding DPD-type processing are described, for example, in PCT Application PCT/US2019/031714, filed on May 10, 2019, titled "Digital Compensation for a Non-Linear System," which is incorporated herein by reference. The post-gain section 1330 typically includes processing performed subsequent to the CFR processing (and/or DPD processing), including processing performed by a transmit chain (not shown in FIG. 13) that converts and amplifies digital signals into transmittable analog signals. In some embodiments, the transmit chain may include a digital-to-analog converter (DAC), which is coupled (directly, or indirectly via, for example, a variable gain amplifier (VGA) and/or a driver) to a power amplifier to produce amplified output signals that are then transmitted (e.g., after optionally being processed by a filter such as a bandpass filter, that can remove unwanted harmonics or other signal noise) via an antenna. In some embodiments, the transmitter chain of the post-gain section 1330 may also include an observation receiver (also referred to as an observation path circuitry) to measure the amplified output signals produced by the PA in order to facilitate a DPD adaptation process. The observation receiver can include a variable attenuator whose output is coupled to an analog-to-digital converter (ADC). Signals produced by the observation path circuitry may be provided to, for example, an adaptation module to perform, for example, a DPD adaptation process.

With continued reference to FIG. 13, the CFR section 1320 includes one or more configurable filter stages that can be adjustably configured (e.g., through selection of the number of stages to realize for the CFR processing, and/or selection of the number of coefficients) to implement one or more FIR filters (in some embodiments, IIR filters may also be realized). As noted, In some situations, the particular spectral (e.g., asymmetrical) mask can be selected depending on the particular band of operation a wireless device operates in (which may depend, for example, on the availability of wireless resources, the wireless operators available in a particular geographic locale, etc.) The wireless device will transmit signals that need to conform with one or more regulatory spectral power requirements affecting the transmission band(s). Accordingly, in such situations, upon determination of the band, a spectral mask is identified or determined that is associated with the determined band. For example, if the wireless device is to operate in a WiFi channel that is adjacent to an LTE band subjected to FCC spectral power requirements, the mask associated with the WiFi Channel 1 may be one that is based on the masks shown in FIG. 12. In this example, the mask that will constrain CFR operation will be an asymmetric mask comprising the vertical line 1212 (from the FCC spectral mask 1210) and the sloped line 1224 (from the IEEE spectral mask 1220).

Based on the spectral mask used (which may or may not be associated with a determined band of operation), the configuration of the CFR section is determined. The CFR section configuration may be determined dynamically (i.e., derived at runtime upon determination of the band of operation for the wireless device, according to regulatory spectral requirements, and the specific system and environmental characteristics), or may be selected from a lookup table (e.g., according to the specific band in which the wireless device is operating). As discussed with respect to FIG. 8, in some examples CFR processing can be implemented as a cascade of CFR stages, with each stage typically comprising a peak detector (such as the detector 820 illustrated in FIG. 8) and an FIR filter (such as the filter 830 of FIG. 8) that is configured to apply an (optimized) impulse responses to the incoming impulse stream (rather than scale a pre-determined signal that is to be subtracted from the input signal at approximately the detected peak location(s) of the signal). Thus, in some of the embodiments of FIG. 13, the wireless device will have available a certain number of multiplier elements and delay elements (e.g., provided in the coefficient hardware unit 1322) that, depending on the particular spectral mask to be used, will be arranged into p filter stages (with p≥1), with each stage comprising an FIR filter with $l_i$ taps (e.g., $l_i$ multiplier elements and $l_i$ delay elements), with i representing the CFR stage, and with the aggregate number of taps used in the p CFR stages not exceeding the maximum available multiplier and delay elements. Thus, the available multiplication and delay elements can be adjustably allocated to the needed numbers of filter stages according to the emission mask to be used (which in turn may depend on the current band the wireless device is using). For example, to implement CFR processing constrained by an asymmetric spectral mask, an FIR filter with a relatively large number of taps would be required to meet the sharp boundaries (or contours) of the asymmetric mask. Accordingly, for such an example, the CFR processing implementation may use fewer number of stages, e.g., use one long filter stage, resulting in a long impulse response, instead of using three stages with shorter impulse responses. Consider an example where there is a total of 150 taps available. If the band of operation is determined to be WiFi channel 1 (i.e., adjacent to an LTE edge band), which in turn is associated with an asymmetric spectral mask such as the one described in relation to FIG. 12, the CFR section 1320 may be implemented with one FIR filter having 150 taps (longer filters provide better spectral control, but result in poorer control of the peak behavior). On the other hand, if the wireless device's band of operation is a non-edge band (be it a middle WiFi channel or a middle WWAN band that may need to comply with only one set of spectral regulatory requirement) three (3) stages, each with 50 taps, may be used to implement the CFR processing (the number of taps for each FIR does not need to be the same for each stage).

Thus, in embodiments in which the CFR approach is based on use of a CFR pulse subtraction filter chain, the controller may be adapted to configure the CFR pulse subtraction filter chain with a number of CFR stages, p, with p≥1, and with respective stage lengths, l, representative of filter tap numbers for the respective p stages, with p and l depending on characteristics of the asymmetrical spectral mask. The controller can be adapted to realize the CFR pulse subtraction filter chain with p stage and respective stage lengths l based on slopes of segments defining the asymmetrical spectral mask. In some examples, each of the p CFR stages may include a respective peak detector coupled, at an output of the respective peak detector, to a respective finite impulse response (FIR) filter with adjustable coefficients optimized subject to the constraint that output signals generated at an output of the CFR pulse subtraction filter chain are bound by the asymmetrical spectral mask. In such examples, the controller may be configured, at one of the p CFR stages, to generate, by the respective peak detector and based on a respective CFR-stage input signal to the respective one of the p CFR stages, a center-clipped signal representing samples of the respective CFR-stage input signal with a magnitude greater than $\gamma_i$, where $\gamma_i$ is a clipping threshold for the respective peak detector of the respective one of the p CFR stages.

As noted, in some examples, the CFR system's controller implemented to configure the CFR processing characteristics may be configured to select, based on the determined spectral band, one of a plurality of pre-determined CFR filters (alternatively, CFR filters may be derived and implemented during runtime, to realize filters that more optimally meet existing operating point conditions). The controller may thus be implemented to configure, based on a determined spectral band, a CFR pulse subtraction filter chain with a number of CFR stages, p, with p≥1, and with respective stage lengths, l, representative of filter tap numbers for the respective p stage, with p and l depending on the determined spectral band and on the spectral mask. In such embodiments, the controller may be adapted to realize the CFR pulse subtraction filter chain with p stage and respective stage lengths l based on slopes of curve segments defining the spectral mask near the location of the determined spectral band. Each of the p CFR stages may include a respective peak detector coupled, at an output of the respective peak detector, to a respective finite impulse response (FIR) filter with adjustable coefficients optimized subject to the constraint that output signals generated at an output of the CFR pulse subtraction filter chain are bound by the pre-determined spectral mask (e.g., an asymmetrical spectral mask).

As was discussed above in relation to FIG. 8, a configurable FIR filter for a particular stage within the CFR section 1320 of FIG. 13 may be realized to have an optimized (or near-optimized) impulse responses to incoming impulse stream of samples representative of detected peak location (s) (generated by the respective peak detectors of each stage). Such an FIR filter yields an output signal that, when added (e.g., using an adder such as the adder 840 of FIG. 8) to the input signal for that stage, results in a signal whose peaks have been reduced and whose spectral content meets the spectral mask constraint for the particular RF band associated with the input signal (e.g., an asymmetric mask for an edge band affected by two or more different regulatory sets of spectral requirements). As described herein, FIR coefficient optimization (in this case for the FIR filters of the CFR section 1320) can be performed, in some examples, by computing filter coefficient sets that achieves the best EVM (for a given PAPR) without breaching an emission/spectral mask (e.g., an asymmetrical mask). Such a computation can be performed after determination of the number of CFR stages and/or the filter sizes (in terms of the number of taps) in accordance with, for example, the RF band the wireless device is operating in. Alternatively, the number of stages and filter sizes can be determined as part of the computation procedure used to determine coefficient values (i.e., together with the computation of the filter coefficients, which may be determined based on some filter design criteria given the constraints of the determined number of filter stages and taps). As noted, in some embodiments, such computation procedures (e.g., to determine the number of filter stages, the stage lengths, and coefficient values) may be performed at an earlier time (e.g., during design time), although these procedures may also be performed at runtime.

Figure 14:
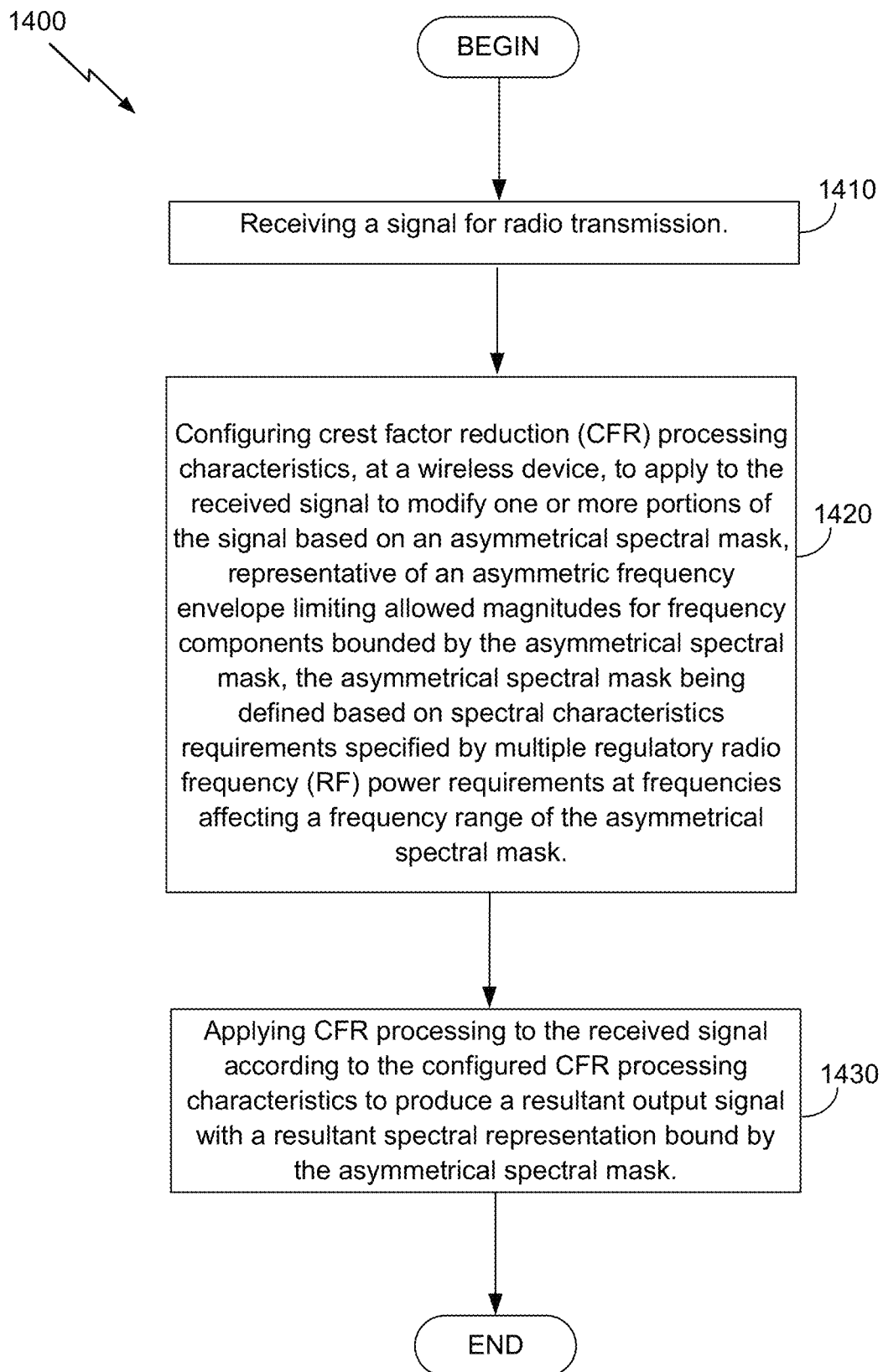
FIG. 14 is a flowchart of an example procedure for crest factor reduction processing.

With reference next to FIG. 14, a flowchart of an example procedure 1400 for crest factor reduction processing is shown. The procedure 1400 implements a CFR procedure for which, as discussed more particularly in relation to FIGS. 11-13, a spectral mask (e.g., an asymmetrical mask) that represents spectral constraints caused by one or more regulatory requirements in the present geographical locale is used (such a spectral band may result in a particular spectral mask, while another spectral band may result in a different spectral mask).

As shown, the procedure 1400 includes receiving 1410 a signal for radio transmission, and configuring 1420 crest factor reduction (CFR) processing characteristics, at a wireless device (e.g., a personal mobile device, or a base station/access point), to apply to the received signal to modify one or more portions of the signal based on an asymmetrical spectral mask, representative of an asymmetric frequency envelope limiting allowed magnitudes for frequency components bounded by the asymmetrical spectral mask, the asymmetrical spectral mask being defined based on spectral characteristics requirements specified by multiple regulatory radio frequency (RF) power requirements at frequencies affecting a frequency range of the asymmetrical spectral mask. Examples of such regulatory RF power requirements include an IEEE RF power requirements and/or a Federal Communication Commission (FCC) RF power requirements.

In some examples, the procedure 1400 may further include determining a spectral band for operation of the wireless device. Determination of the RF band may be based on the received RF signal (e.g., to determine the signal's carrier frequency, and thus determine the band in which the device is, and will be, operating). In situations where the spectral band is determined, configuring CFR processing characteristics may include configuring CFR processing characteristics based on the determined spectral band to modify one or more portions of the signal based on a respective, band-related, asymmetrical spectral mask associated with the determined spectral band. Configuring the CFR processing characteristics may include selecting, based on the determined spectral band, one of a plurality of CFR filters.

In some embodiments, and as also described in FIGS. 8 and 13, configuring the CFR processing characteristics may include configuring, based on the determined spectral band, a CFR pulse subtraction filter chain with a number of CFR stages, p, with p≥1, and with respective stage lengths, l, representative of filter tap numbers for the respective p stage, with p and l depending on the determined spectral band and on the respective band-related asymmetrical spectral mask. Thus, different CFR stages may have different filter sizes (i.e., tap numbers or lengths). Configuring the pulse subtraction filter chain may include realizing the CFR pulse subtraction filter chain with p stage and respective stage lengths l based on slopes of segments defining the respective band-related asymmetrical spectral mask near the location of the determined spectral band. An example of such curves or line segments is provided in FIG. 12. Each of the p CFR stages may include a respective peak detector coupled, at an output of the respective peak detector, to a respective finite impulse response (FIR) filter with adjustable coefficients optimized subject to the constraint that output signals generated at an output of the CFR pulse subtraction filter chain are bound by the respective band-related asymmetrical spectral mask.

The use of an adjustable, configurable CFR pulse subtraction filter chain can be perform independently of a determination of a spectral band (i.e., determining the spectral band is not a necessary step for configuring a multi-stage CFR pulse subtraction filter chain to implement CFR operation, or for implementing some other CFR approach). Thus, in some example, configuring the CFR processing characteristics may include configuring a CFR pulse subtraction filter chain with a number of CFR stages, p, with p≥1, and with respective stage lengths, l, representative of filter tap numbers for the respective p stage, with p and l depending on characteristics of the asymmetrical spectral mask. Configuring the pulse subtraction filter chain may include realizing the CFR pulse subtraction filter chain with p stage and respective stage lengths l based on slopes of segments defining the asymmetrical spectral mask near the location of the determined spectral band. In some examples, each of the p CFR stages may include a respective peak detector coupled, at an output of the respective peak detector, to a respective finite impulse response (FIR) filter with adjustable coefficients optimized subject to the constraint that output signals generated at an output of the CFR pulse subtraction filter chain are bound by the asymmetrical spectral mask. Processing the received signal by the CFR pulse subtraction filter chain may include generating, by the respective peak detector, based on a respective CFR-stage input signal to the respective one of the p CFR stages, a center-clipped signal representing samples of the respective CFR-stage input signal with a magnitude greater than $\gamma_i$, where $\gamma_i$ is a clipping threshold for the respective peak detector of the respective one of the p CFR stages. Generating the center-clipped signal may include generating the center-clipped signal according to:

$$u_{PEAKS-i}[n] = u_{i-1}[n] - \frac{u_{i-1}[n]}{\max\left(1, \frac{|u_{i-1}[n]|}{\gamma_i}\right)}$$

where $u_{PEAKS-i}[n]$ is the center-clipped signal, i is a respective stage number from the p CFR stages, and $u_{i-1}[n]$ is the respective CFR-stage input signal to the respective stage.

With continued reference to FIG. 14, the procedure 1400 further includes applying 1430 CFR processing to the received signal according to the configured CFR processing characteristics to produce a resultant output signal with a resultant spectral representation bound by the asymmetrical spectral mask.

The configured CFR processing characteristics may be determined based on processing input signals to generate respective output signals according to one or more optimization criteria, and subject to a constraint that a spectral representation of the generated respective output signals are bound by the asymmetrical spectral mask.

Figure 10:
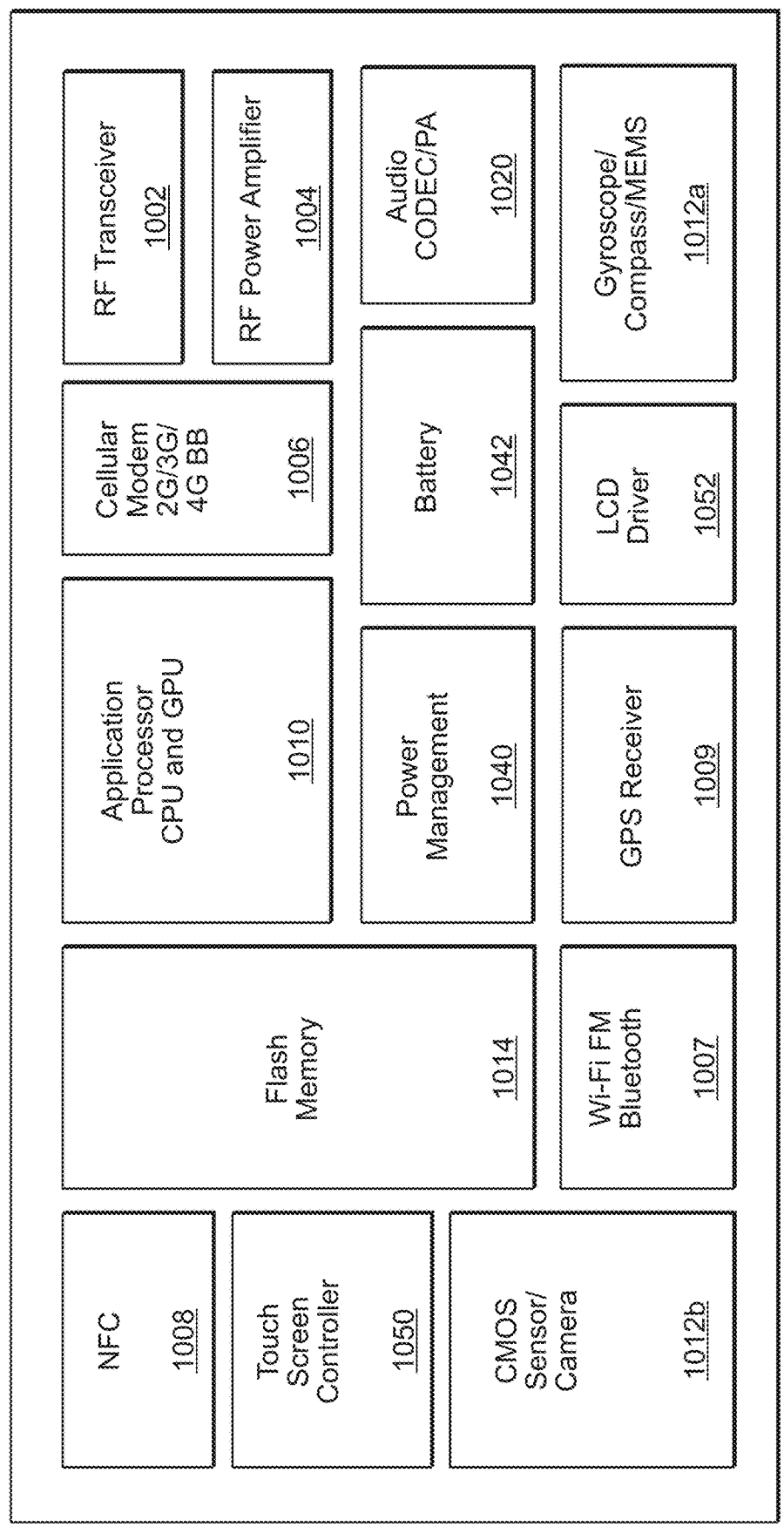
FIG. 10 is a block diagram of an example device which may be used to implement spectrum shaping CFR processing.

With reference next to FIG. 10, a schematic diagram of an example wireless device 1000 (e.g., a mobile device or handset, although a similar configuration may also be used to implement a network node, such as a WLAN access point or a WWAN base station, etc.), which may be used to implement the CFR procedures and systems described herein is shown. It is to be noted that one or more of the modules and/or functions illustrated in the example device of FIG. 10 may be further subdivided, or two or more of the modules or functions illustrated in FIG. 10 may be combined. Additionally, one or more of the modules or functions illustrated in FIG. 10 may be excluded. The various modules and components of the device 1000 may be connected through a bus or through other electrical connections and interfaces (not shown in FIG. 10).

The example device 1000 may include an RF transceiver 1002 (also referred to as an RF communication module) comprising one or more RF transceivers that may be connected to one or more antennas and to an RF front end unit comprising, for example, an RF power amplifier 1004, and a cellular modem 1006. The RF amplifier may include an amplification, digital predistortion, and/or CFR circuitry (e.g., implemented using pulse subtraction approaches, or FIR approaches such as those described in relation to FIG. 8) to mitigate non-linear behavior caused by the amplifier or other elements of a transmit chain. The modem circuitry implemented by the cellular modem 1006 is generally configured to perform modulation and demodulation operations for wireless signals in various bands and for various communication protocols (including 2G, 3G, 4G, 5G, and various other communication technologies in licensed and unlicensed bands). The RF front end circuitry, which may comprise the blocks 1004 and 1006 depicted in FIG. 10, may thus include power amplifiers, LNAs, digital-to-analog converters, analog-to-digital converters, filters, switches and other RF front-end modules, and, in some embodiments, at least some of the RF front end modules may be arranged to realize, at least in part, the CFR implementations described herein. The transceivers of the RF transceiver block 1002 may comprise suitable devices, hardware, and/or software for communicating with and/or detecting signals to/from a network or remote devices. In some embodiments, the RF transceiver 1002 may support wireless LAN communication (e.g., WLAN, such as WiFi-based communications) to thus cause the device 1000 to be part of a WLAN. As noted, in some embodiments, the RF transceiver 1002 may also support the device 1000 to communicate with one or more cellular access points (also referred to as a base station), which may be used for wireless voice and/or data communication. The transceiver 1002 may be used to communicate according to any type of WWAN protocol, including any 3GPP or IEEE standards (implemented over licensed and unlicensed frequency bands).

In some implementations, short range communication may be realized through dedicated circuitry such as the circuitry implemented by a WiFi FM Bluetooth module 1007. The module 1007 may thus be configured to allow the device 400 to communicate with in-range remote devices configured according to any short-range communication protocol. In addition, the device 1000 may also include a wired network connection (e.g., implemented using a USB port, or some other wired port) to communicate with another device. Another communication module that may be included with the device 1000 is a near-field communication (NFC) module 1008 configured to allow communication with neighboring device according to NFC protocols. In some variations, the device 1000 may also include a GPS receiver 1009 connected to one or more antennas, and configured to receive satellite signals. The GPS receiver 1009 may comprise any suitable hardware and/or software for receiving and processing GPS signals from satellite vehicles. The GPS receiver 1009 may request information as appropriate from the other systems, and may perform the computations necessary to determine the device's 1000 position using, in part, measurements obtained by any suitable satellite positioning system (SPS) procedure. Such positioning information may be used, for example, to determine the location and motion of the device 1000.

With continued reference to FIG. 10, the device 1000 may include one or more sensors that communicate, through wired or wireless communication links, with a controller/processor 1010 (comprising, for example, an application processor CPU and GPU). The one or more sensors may include motion sensors (also referred to as orientation or inertial sensors), such as a gyroscope/compass sensor 1012a, that may be implemented using micro-electro-mechanical systems (MEMS) technology. Other examples of motion sensors include an accelerometer, a magnetometer, etc. Another type of sensor that may be used is an audio sensor (e.g., a microphone) to record voice or sound information (which may then be converted to audio data via an audio CODEC/PA module 1020, with the audio data then optionally transmitted to a remote device via the front end circuitry and the RF transceiver 1002 or one of the other communication modules of the device 1000). Also illustrated in FIG. 10 is a CMOS sensor/camera 1012b configured to capture and record optical/light signals to produce still or moving images. Other types of sensors may also be included with the device 1000.

The controller/processor 1010 may be connected to the various communication modules and/or the front-end circuitry, and to the various sensors. As noted, the controller may include one or more microprocessors, microcontrollers, and/or digital signal processors that provide processing functions, as well as other computation and control functionality. The device 1000 may also include special purpose logic circuitry, e.g., an FPGA (field programmable gate array), an ASIC (application-specific integrated circuit), a DSP processor, a graphics processing unit (GPU), an accelerated processing unit (APU), an application processor, customized dedicated circuitry, etc., to implement, at least in part, the processes and functionality for the device 1000. The controller 1010 may be coupled to a memory 1014 (shown in FIG. 10 as flash memory) for storing data and software instructions for executing programmed functionality within the device. Generally speaking, a computer accessible storage medium may include any non-transitory storage media accessible by a computer during use to provide instructions and/or data to the computer. For example, a computer accessible storage medium may include storage media such as magnetic or optical disks and semiconductor (solid-state) memories, DRAM, SRAM, etc.

The device 1000 may be configured to (e.g., via hardware resident in the device and/or software modules/applications provided on the memory 1014) to implement a process to determine perform spectrum shaping crest factor reduction (e.g., according to the procedures described herein, including the procedures depicted in FIG. 4). For example, the device 1000 may be configured to receive a signal for radio transmission, adjust crest factor reduction (CFR) processing characteristics applied to the received signal to modify one or more portions of the signal according to a spectral mask (e.g., including asymmetric spectral masks specifying power requirements resulting from two or more regulatory bodies) representative of a frequency envelope limiting allowed magnitudes for frequency components bounded by the spectral mask (including to adjust the CFR processing characteristics according to one or more optimization criteria for output signals generated based on the adjusted CFR processing characteristics, and subject to a constraint that the output signals generated based on the adjusted CFR processing characteristics are bound by the spectral mask), apply CFR processing with the adjusted CFR processing characteristics to the received signal to produce a resultant modified signal, and amplify the resultant modified signal. The memory 1014 may be on-board the controller 1010 (e.g., within the same IC package), and/or may be external memory to the processor and coupled thereto over a data bus.

The example device 1000 may further include a user interface which provides any suitable interface systems, such as a microphone/speaker (which may be included with the Audio CODEC/PA module 1020), keypad or a touchscreen 1050 (or some other user-interface input mechanism), and a display 1052 (shown as LCD Driver) that allows user interaction with the device 1000. Such a user interface, be it an audiovisual interface (e.g., a display and speakers), or some other type of interface (visual-only, audio-only, tactile, etc.), configured to provide status data, alert data, and so on, to a user using the device 1000. The microphone/speaker facilitates for voice communication functionality, and may also include or be coupled to a speech synthesizer (e.g., a text-to-speech module) that can convert text data to audio speech so that the user can receive audio notifications. Such a speech synthesizer may be a separate module, or may be integrally coupled to the microphone/speaker or to the controller 1010 of the device of FIG. 10. The input interface (that includes the touchscreen controller 1050) may further include suitable buttons for user input. The display (controlled by the LCD Driver 1052) may include any suitable display, such as, for example, a backlit LCD display.

The device 1000 may further include a power management unit 1040 that controls power consumption of the device provided through a power storage device 1042 (e.g., a battery) coupled to the power management unit. In some embodiments, the power management unit 1040 may include (or may regulate) a power conversion module that receives and regulates power from an outside source (e.g., AC power), with such received power being used to recharge the battery 1042.

Some of the implementations described herein, as illustrated in FIGS. 1-10, are applicable to a wide range of technologies that include RF technologies (including WWAN technologies, such as cellular technologies, and WLAN technologies), satellite communication technologies, cable modem technologies, wired network technologies, optical communication technologies, and all other RF and non-RF communication technologies. The implementations described herein encompass all techniques and embodiments that pertain to use of spectrum shaping CFR processing in various different communication systems.

In some implementations, a computer accessible non-transitory storage medium includes a database (also referred to a "design structure" or "integrated circuit definition dataset") representative of a system including some or all of the components of the spectrum shaping crest factor reduction system. Generally speaking, a computer accessible storage medium may include any non-transitory storage media accessible by a computer during use to provide instructions and/or data to the computer. For example, a computer accessible storage medium may include storage media such as magnetic or optical disks and semiconductor memories. Generally, the database representative of the system may be a database or other data structure which can be read by a program and used, directly or indirectly, to fabricate the hardware comprising the system. For example, the database may be a behavioral-level description or register-transfer level (RTL) description of the hardware functionality in a high-level design language (HDL) such as Verilog or VHDL. The description may be read by a synthesis tool which may synthesize the description to produce a netlist comprising a list of gates from a synthesis library. The netlist comprises a set of gates which also represents the functionality of the hardware comprising the system. The netlist may then be placed and routed to produce a data set describing geometric shapes to be applied to masks. The masks may then be used in various semiconductor fabrication steps to produce a semiconductor circuit or circuits corresponding to the system. In other examples, the database may itself be the netlist (with or without the synthesis library) or the data set.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

Although particular embodiments have been disclosed herein in detail, this has been done by way of example for purposes of illustration only, and is not intended to be limit the scope of the invention, which is defined by the scope of the appended claims. Features of the disclosed embodiments can be combined, rearranged, etc., within the scope of the invention to produce more embodiments. Some other aspects, advantages, and modifications are considered to be within the scope of the claims provided below. The claims presented are representative of at least some of the embodiments and features disclosed herein. Other unclaimed embodiments and features are also contemplated.

What is claimed is:

1. A method comprising:
    receiving a signal for radio transmission;
    configuring crest factor reduction (CFR) processing characteristics, at a wireless device, to apply to the received signal to modify one or more portions of the received signal based on an asymmetrical spectral mask, representative of an asymmetric frequency envelope limiting allowed magnitudes for frequency components bounded by the asymmetrical spectral mask, the asymmetrical spectral mask being defined based on spectral characteristics requirements specified by multiple regulatory radio frequency (RF) power requirements at frequencies affecting a frequency range of the asymmetrical spectral mask; and
    applying CFR processing to the received signal according to the configured CFR processing characteristics to produce a resultant output signal with a resultant spectral representation bound by the asymmetrical spectral mask.

2. The method of claim 1, further comprising determining a spectral band for operation of the wireless device;
    wherein configuring CFR processing characteristics comprises configuring CFR processing characteristics based on the determined spectral band to modify one or more portions of the received signal based on a respective, band-related, asymmetrical spectral mask associated with the determined spectral band.

3. The method of claim 2, wherein configuring the CFR processing characteristics comprises:
    selecting, based on the determined spectral band, one of a plurality of pre-determined CFR filters.

4. The method of claim 2, wherein configuring the CFR processing characteristics comprises:

configuring, based on the determined spectral band, a CFR pulse subtraction filter chain with a number of CFR stages, p, with p≥1, and with respective stage lengths, l, representative of filter tap numbers for the respective p stage, with p and l depending on the determined spectral band and on the respective band-related asymmetrical spectral mask.

5. The method of claim 4, wherein configuring the pulse subtraction filter chain comprises realizing the CFR pulse subtraction filter chain with the p stages and respective stage lengths l based on slopes of segments defining the respective band-related asymmetrical spectral mask near the location of the determined spectral band.

6. The method of claim 5, wherein each of the p CFR stages includes a respective peak detector coupled, at an output of the respective peak detector, to a respective finite impulse response (FIR) filter with adjustable coefficients optimized subject to a constraint that output signals generated at an output of the CFR pulse subtraction filter chain are bound by the respective band-related asymmetrical spectral mask.

7. The method of claim 1, wherein the multiple regulatory RF power requirements include one or more of: an IEEE RF power requirements, or a Federal Communication Commission (FCC) RF power requirements.

8. The method of claim 1, wherein the configured CFR processing characteristics are determined based on processing input signals to generate respective output signals according to one or more optimization criteria, and subject to a constraint that a spectral representation of the generated respective output signals are bound by the asymmetrical spectral mask.

9. The method of claim 1, wherein configuring the CFR processing characteristics comprises:
configuring a CFR pulse subtraction filter chain with a number of CFR stages, p, with p≥1, and with respective stage lengths, l, representative of filter tap numbers for the respective p stage, with p and l depending on characteristics of the asymmetrical spectral mask.

10. The method of claim 9, wherein configuring the pulse subtraction filter chain comprises:
realizing the CFR pulse subtraction filter chain with p stage and respective stage lengths l based on slopes of segments defining the asymmetrical spectral mask near the location of the determined spectral band.

11. The method of claim 9, wherein each of the p CFR stages includes a respective peak detector coupled, at an output of the respective peak detector, to a respective finite impulse response (FIR) filter with adjustable coefficients optimized subject to a constraint that output signals generated at an output of the CFR pulse subtraction filter chain are bound by the asymmetrical spectral mask.

12. The method of claim 11, wherein processing the received signal by the CFR pulse subtraction filter chain comprises:
generating, by the respective peak detector, based on a respective CFR-stage input signal to the respective one of the p CFR stages, a center-clipped signal representing samples of the respective CFR-stage input signal with a magnitude greater than $\gamma_i$, where $\gamma_i$ is a clipping threshold for the respective peak detector of the respective one of the p CFR stages.

13. The method of claim 12, wherein generating the center-clipped signal comprises:
generating the center-clipped signal according to:

$$u_{PEAKS-i}[n] = u_{i-1}[n] - \frac{u_{i-1}[n]}{\max\left(1, \frac{|u_{i-1}[n]|}{\gamma_i}\right)}$$

where $u_{PEAKS-i}[n]$ is the center-clipped signal, i is a respective stage number from the p CFR stages, and $u_{i-1}[n]$ is the respective CFR-stage input signal to the respective stage.

14. A crest factor reduction (CFR) system comprising:
a controller configured to:
receive a signal for radio transmission;
configure crest factor reduction (CFR) processing characteristics to apply to the received signal to modify one or more portions of the received signal based on an asymmetrical spectral mask, representative of an asymmetric frequency envelope limiting allowed magnitudes for frequency components bounded by the asymmetrical spectral mask, the asymmetrical spectral mask being defined based on spectral characteristics specified by multiple regulatory radio frequency (RF) power requirements at frequencies affecting a frequency range of the asymmetrical spectral mask; and
apply CFR processing to the received signal according to the configured CFR processing characteristics to produce a resultant output signal with a resultant spectral representation bound by the asymmetrical spectral mask; and
an amplifier to amplify the resultant output signal.

15. The CFR system of claim 14, wherein the controller is further configured to determine a spectral band for operation of the CFR system;
wherein the controller to configure CFR processing characteristics is configured to configure CFR processing characteristics based on the determined spectral band to modify one or more portions of the received signal based on a respective, band-related, asymmetrical spectral mask associated with the determined spectral band.

16. The CFR system of claim 15, wherein the controller to configure the CFR processing characteristics is configured to:
select, based on the determined spectral band, one of a plurality of pre-determined CFR filters.

17. The CFR system of claim 15, wherein the controller further comprises a CFR pulse subtraction filter chain, and wherein the controller configured to configure the CFR processing characteristics is configured to:
configure the CFR pulse subtraction filter chain with a number of CFR stages, p, with p≥1, and with respective stage lengths, l, representative of filter tap numbers for the respective p stage, with p and l depending on characteristics of the asymmetrical spectral mask.

18. The CFR system of claim 17, wherein the controller to configure the pulse subtraction filter chain is configured to realize the CFR pulse subtraction filter chain with the p stages and the respective stage lengths l based on slopes of segments defining the asymmetrical spectral mask.

19. The CFR system of claim 18, wherein each of the p CFR stages includes a respective peak detector coupled, at an output of the respective peak detector, to a respective finite impulse response (FIR) filter with adjustable coefficients optimized subject to a constraint that output signals generated at an output of the CFR pulse subtraction filter chain are bound by the asymmetrical spectral mask.

20. A design structure encoded on a non-transitory machine-readable medium, said design structure comprising elements that, when processed in a computer-aided design system, generate a machine-executable representation of a crest factor reduction system comprising:
- a receiving circuit to receive a signal for radio transmission;
- a controller circuit to configure crest factor reduction (CFR) processing characteristics, at a wireless device, to apply to the received signal to modify one or more portions of the received signal based on an asymmetrical spectral mask, representative of an asymmetric frequency envelope limiting allowed magnitudes for frequency components bounded by the asymmetrical spectral mask, the asymmetrical spectral mask being defined based on spectral characteristics requirements specified by multiple regulatory radio frequency (RF) power requirements at frequencies affecting a frequency range of the asymmetrical spectral mask; and
- a CFR circuit to apply CFR processing to the received signal according to the configured CFR processing characteristics to produce a resultant output signal with a resultant spectral representation bound by the asymmetrical spectral mask.

* * * * *